United States Patent [19]

Moylan

[11] 4,090,034
[45] May 16, 1978

[54] USAGE-SENSITIVE BILLING ARRANGEMENT FOR PRIVATE BRANCH EXCHANGE SUBSCRIBERS

[75] Inventor: Philip John Moylan, Genoa Township, Delaware County, Ohio

[73] Assignee: Bell Telephone Laboratories, Incorporated, Murray Hill, N.J.

[21] Appl. No.: 805,119

[22] Filed: Jun. 9, 1977

[51] Int. Cl.² .......................................... H04M 15/12
[52] U.S. Cl. .............................. 179/7.1 R; 179/7 R
[58] Field of Search ............... 179/7 R, 7.1 R, 7 MM, 179/7.1 TP, 8 R, 8 A, 18 ES

[56] References Cited

U.S. PATENT DOCUMENTS

| | | | |
|---|---|---|---|
| 3,227,807 | 1/1966 | McLean | 179/7.1 R |
| 3,400,222 | 9/1968 | Nightingale et al. | 179/7.1 R |
| 3,818,456 | 6/1974 | McDonald et al. | 179/8 R |
| 3,851,102 | 11/1974 | Bauernfield et al. | 179/7.1 TP |
| 3,920,911 | 11/1975 | Lukas | 179/7.1 TP |
| 3,925,623 | 12/1975 | Tysieland | 179/7 R |

Primary Examiner—Kathleen H. Claffy
Assistant Examiner—Gerald L. Brigance
Attorney, Agent, or Firm—Charles H. Davis

[57] ABSTRACT

A telephone system is disclosed including hotel and motel private branch exchanges (PBXs), a local step-by-step exchange serving the PBXs, and a remote message accounting center. A call data accumulator at the local exchange monitors line finders and cooperates with automatic number identification circuits to transmit to the accounting center call information such as calling and called subscriber numbers and answer and disconnect times. The accounting center computes usage-sensitive billing data for local calls based on the distance between calling and called subscribers and call duration. The accounting center further transmits usage-sensitive hotel/motel message register pulsing information to pulsing circuitry, including a microprocessor, at the local exchange. The pulsing circuitry, in turn, operates identified hotel/motel message registers in accordance with the information received from the accounting center.

13 Claims, 22 Drawing Figures

*FIG. 5*

| DEFINITION | THRESHOLD ASSIGNMENT | | | | |
|---|---|---|---|---|---|
| | LETTER | TH4 | 3 | 2 | 1 |
| CLOSED LOOP-NO SLEEVE | A | 0 | 0 | 0 | 0 |
| OPEN LOOP-NO SLEEVE | B | 0 | 0 | 0 | 1 |
| CLOSED NORM LOOP-WITH SLEEVE | E | 0 | 1 | 0 | 0 |
| OPEN LOOP-WITH SLEEVE | F | 0 | 1 | 0 | 1 |
| CLOSED REVERSED LOOP-WITH SLEEVE | G | 0 | 1 | 1 | 0 |
| OPEN REVERSED LOOP-NO SLEEVE | L | 1 | 0 | 1 | 0 |
| LONG PULSE PRESENT | K | 1 | 0 | 0 | 1 |
| OPEN REVERSED LOOP-WITH SLEEVE | R | 1 | 1 | 1 | 0 |
| UNUSED THRESHOLDS | C | 0 | 0 | 1 | 0 |
| | D | 0 | 0 | 1 | 1 |
| | H | 0 | 1 | 1 | 1 |
| | J | 1 | 0 | 0 | 0 |
| | M | 1 | 0 | 1 | 1 |
| | N | 1 | 1 | 0 | 0 |
| | P | 1 | 1 | 0 | 1 |
| | S | 1 | 1 | 1 | 1 |

INPUT MSG ASSEMBLY TABLE
IAT

ENTITY TABLE
ENTTAB

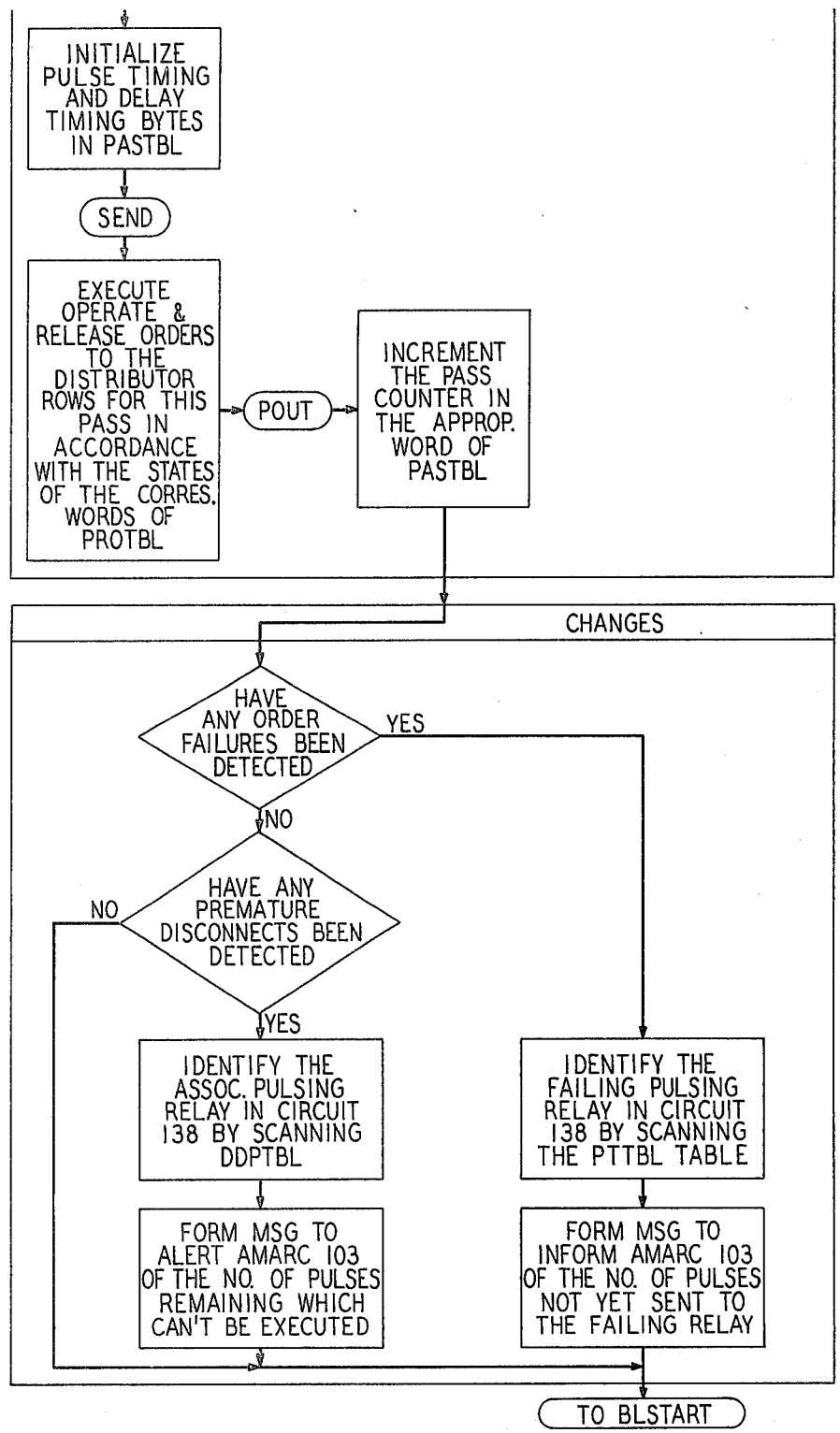

FIG. 22
RMRP TABLE ORGANIZATION

RMRP STATUS WORD - STATWD

| PASS CTR | DISC | TBL | S/D OOS | I/O OOS | MEM OOS | CONT OOS | //// |
|---|---|---|---|---|---|---|---|

PASS TABLE - PASTBL

| | FUNCT | STR | SCK | DELAY TIMING | PULSE TIMING |
|---|---|---|---|---|---|
| 0 | | | | | |
| 1 | | | | | |
| 2 | | | | | |
| 3 | ↓ | ↓ | ↓ | ↓ | ↓ |

PULSING RELAY ORDER TABLE - PROTBL

| | | | | |
|---|---|---|---|---|
| 0 | DIS0 | 14 | — — — — — — — — — — — — | 0 |
| 1 | DIS1 | 29 | — — — — — — — — — — — — | 15 |
| 2 | DIS2 | 44 | — — — — — — — — — — — — | 30 |
| 3 | DIS3 | 59 | — — — — — — — — — — — — | 45 |
| 4 | DIS4 | 74 | — — — — — — — — — — — — | 60 |
| 5 | DIS5 | 89 | — — — — — — — — — — — — | 75 |
| 6 | DIS6 | 104 | — — — — — — — — — — — — | 90 |
| 7 | DIS7 | 119 | — — — — — — — — — — — — | 105 |

Rows 0-3: DIST 0
Rows 4-7: DIST 1

Bit positions: 15   14                                              0

DISCONNECT DURING PULSING TABLE - DDPTBL

| 0 | |
|---|---|
| | SAME LAYOUT AS PROTBL |
| 7 | |

PULSING TROUBLE TABLE - PTTBL

| 0 | |
|---|---|
| | SAME LAYOUT AS PROTBL |
| 7 | |

PULSING DATA REGISTER - PDREG

| | | |
|---|---|---|
| 0 | 1 | 0 |
| | 3 | 2 |
| ⋮ | ⋮ | ⋮ |
| 59 | 119 | 118 |

Bit positions: 15        8  7         0

| BUSY | PULSE COUNT |
|---|---|
| 7 | 6       0 |

USAGE-SENSITIVE BILLING ARRANGEMENT FOR PRIVATE BRANCH EXCHANGE SUBSCRIBERS

BACKGROUND OF THE INVENTION

This invention is related generally to telephone systems and, in particular, to the billing of hotel and motel calls which are served by step-by-step exchanges.

It is a major objective of the telephone industry continually to improve existing telephone services and to introduce new services and features as technology allows. One such innovation was the introduction of automatic message accounting a number of years ago to provide telephone subscribers with itemized billing for long distance, or toll, telephone charges. Automatic message accounting (AMA) systems were incorporated into the local exchanges which had sufficient telephone traffic to justify economically the provision of the AMA equipment. More often, however, such local AMA systems were not economically justifiable. In these cases, AMA systems were usually provided at a tandem exchange through which toll traffic from many smaller exchanges was switched.

The great bulk of telephone traffic, consisting of locally completed calls, is not currently subject to billing by AMA systems. For such calls, some subscribers are periodically charged a flat rate without regard to the actual usage made of the telephone network by the subscriber. Thus, some subscribers, who make few local telephone calls, are charged the same basic flat rate as others who make large numbers of such calls. In other cases, subscribers are charged by means of a combination of flat rate and message rate billing. In these instances, a message register is associated with an individual subscriber, and message units are accumulated in the message register in accordance with the duration of local calls. The subscriber is billed according to the accumulated number of message units in excess of a predetermined number. In either event, the billing is on a bulk basis, and the subscriber has no convenient way of testing the accuracy of the billing, or of attributing portions of the bill to individual calls.

The foregoing situation is changing as a result of the recent introduction of the automatic message accounting and recording system (AMARS), which provides subscribers with itemized billing for local calls in accordance with the actual use made of the telephone network. This is termed usage-sensitive billing, which means that charging is computed according to the distance between calling and called subscriber on local calls and according to the duration of the calls. AMARS includes a remote processing center to which call information identifying calling and called subscribers and answer and disconnect times is routed from local exchanges not having AMA facilities. The processing center performs on-line translation functions of the calling and called numbers to determine a charging rate based on the actual distance of the call, and it provides call timing and makes AMA tape entries for subsequent billing in accordance with the charging rate and call duration.

AMARS fulfills its intended purpose satisfactorily. A problem remains, however, in the billing of local calls from hotels and motels. Hotel/motel guests must be charged by the hotel/motel for their telephone calls according to the amounts ultimately billed to the hotel/motel for those calls. For this purpose, it is still a common practice to locate at the hotel/motel premises a plurality of message registers, individually associated with guest rooms, which are used to measure guest telephone charges. Typically, a message register is pulsed over an M, or message, lead of a PBX trunk line by a trunk circuit associated with the connection in the local exchange serving the call. Although this measures charges based in part on the duration of calls, it does not take into account the distance between calling and called subscribers. In other words, it is not usage-sensitive.

In local exchanges of the common control type which are served by AMARS, it is relatively easy to provide usage-sensitive pulsing to hotel/motel message registers consistent with the billing information stored by AMARS. For example, in a crossbar local exchange, such as the No. 5 crossbar exchange manufactured by Western Electric Company, Inc. and disclosed in A. J. Busch, U.S. Pat. No. 2,585,904, translated routing information, which may be used to establish the usage-sensitive billing treatment to be applied, is obtained from markers for transmission to AMARS. Since the translated information is available at the local exchange, it becomes relatively easy to provide the appropriate message register pulsing from the local exchange to hotel/motel message registers consistently with the information stored by AMARS. U.S. Pat. No. 3,944,746, which issued to T. V. Burns et al on Mar. 16, 1976, discloses one arrangement for retrieving translated information from No. 5 crossbar markers, although message register pulsing is not therein disclosed.

Local step-by-step exchanges, operating in conjunction with AMARS, present an entirely different situation with regard to hotel/motel calls. There are no common control circuits and no available translated information at the exchange which may be used to determine the appropriate hotel/motel message register pulsing.

SUMMARY OF THE INVENTION

It is a primary object of this invention to provide usage-sensitive pulsing to message registers at a remote site served by a telephone exchange.

In accordance with an illustrative exemplary embodiment of the invention, a circuit located at the exchange monitors calling sequences on trunk lines to the exchange from the remote site to receive digits dialed by subscribers at the remote site. Automatic identification equipment at the exchange identifies the trunk lines and this information, together with the dialed digits, is forwarded by the monitoring circuit to an accounting center. Message register pulsing circuitry at the exchange, in turn, receives information from the accounting center identifying pulsing addresses and pulsing sequences and applies pulses to the addresses to pulse message registers located at the remote site.

A feature of this invention is the provision of a remote processor which operates in conjunction with a call data accumulator at a SxS exchange to determine message register pulsing information in accordance with call duration and distance between calling and called subscribers.

Another feature of the invention is the provision of message register pulsing circuits including a microprocessor located at a SxS exchange, which is responsive to information received from the remote processor for pulsing PBX message registers.

BRIEF DESCRIPTION OF THE DRAWING

A more detailed understanding of my invention will be apparent from the following description of an exemplary embodiment thereof, when read in conjunction with the acompanying drawing, in which:

FIG. 5 discloses a table of binary encoded values, called thresholds, which describe states acquired by line finders of the central exchange during the progress of calls, and which are used by the call data accumulator in its call monitoring operations;

FIGS. 19 and 20, when arranged according to FIG. 21, disclose a program flow chart for a microprocessor of the message register pulsing circuit at the central exchange; and FIG. 22 illustrates the memory organization of the microprocessor in the message register pulsing circuit.

GENERAL DESCRIPTION

Figure 11:
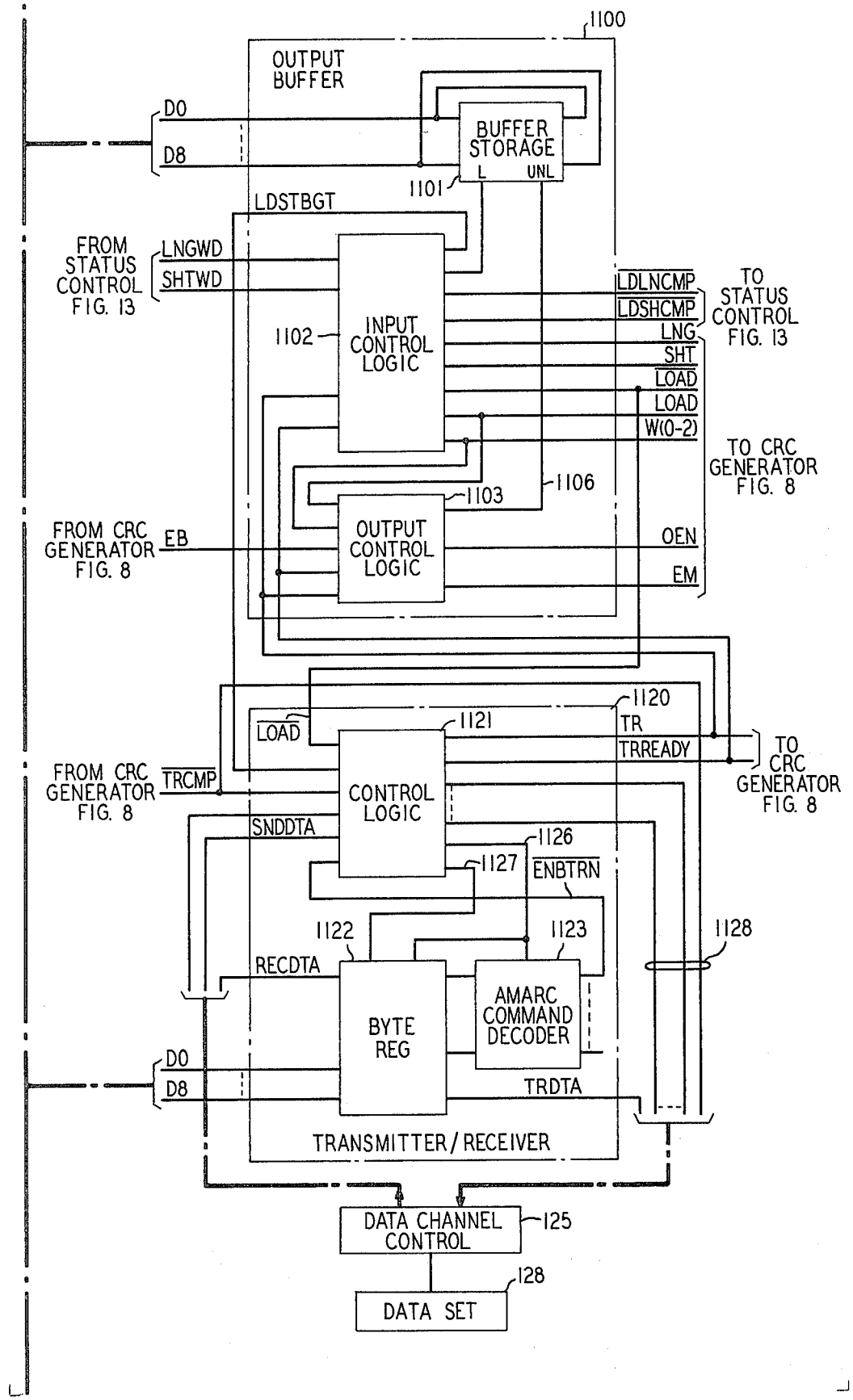
Figure 12:
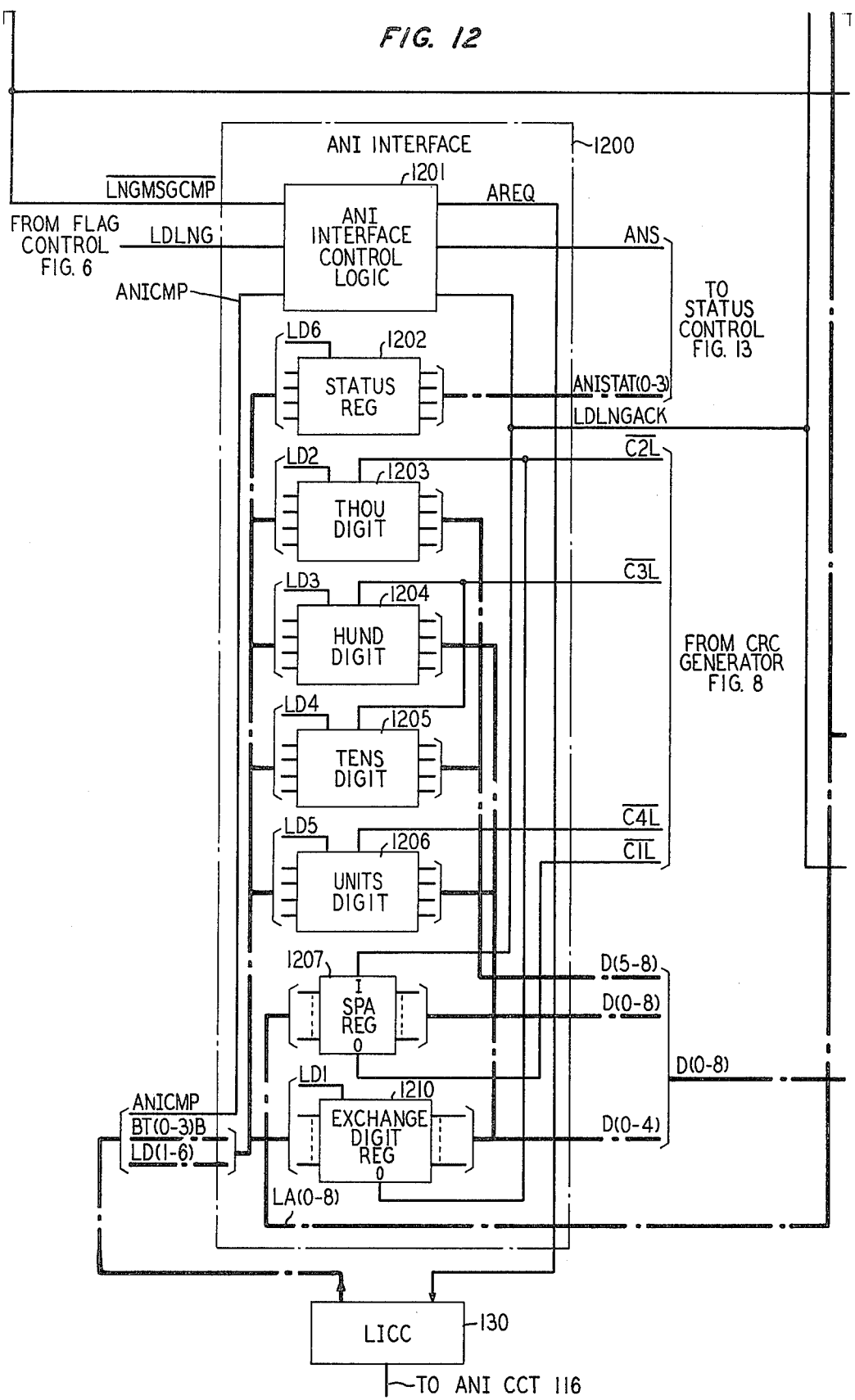
Figure 13:
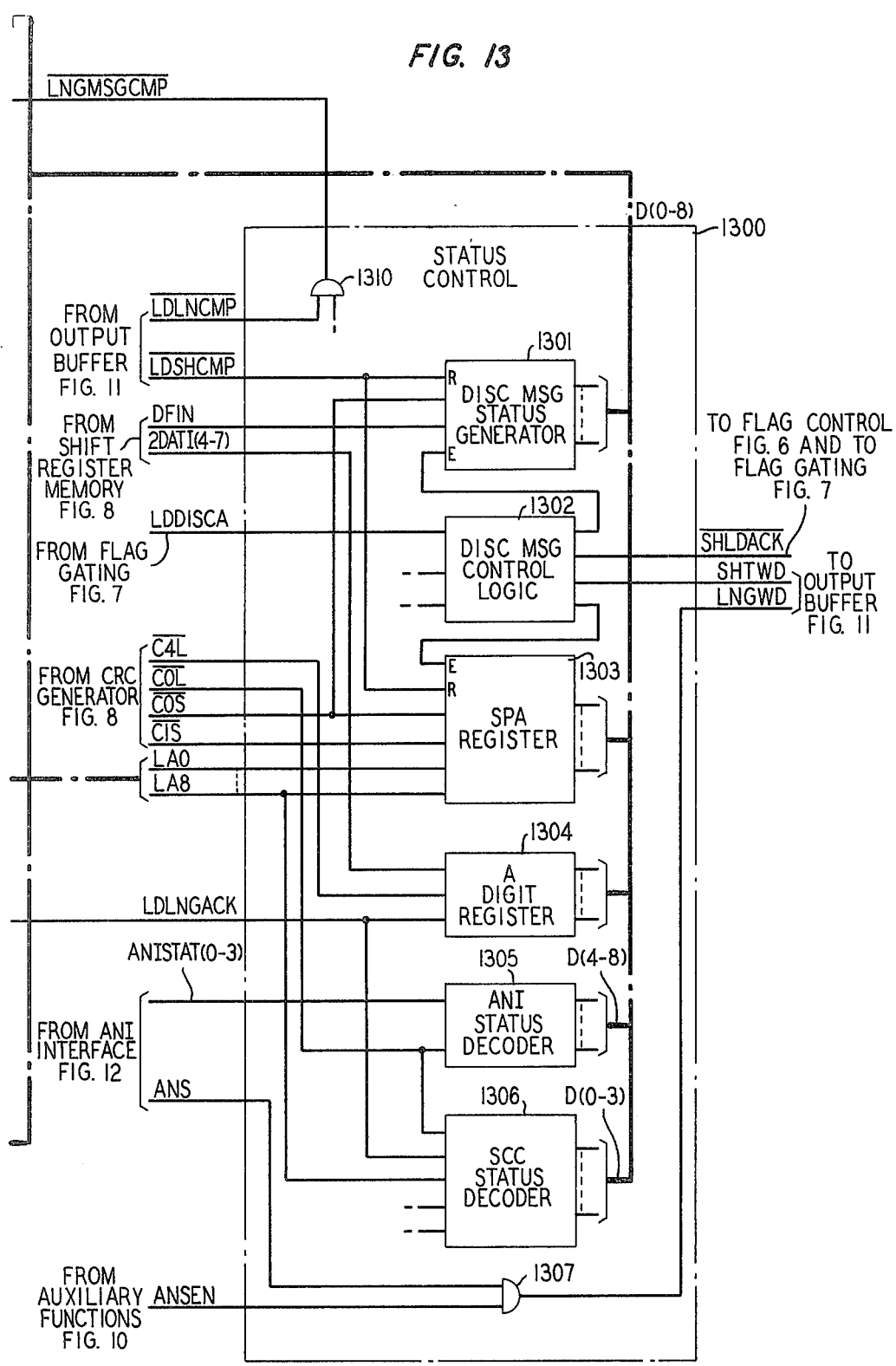

In the description that follows, the first digit of all 3-digit reference numbers and the first 2 digits of all 4-digit reference numbers refer to figure numbers of the drawing in which the referenced item is shown. Thus, for example, circuits having the reference numbers 813 and 1121 are found in respective FIGS. 8 and 11 of the drawing.

Figure 1:
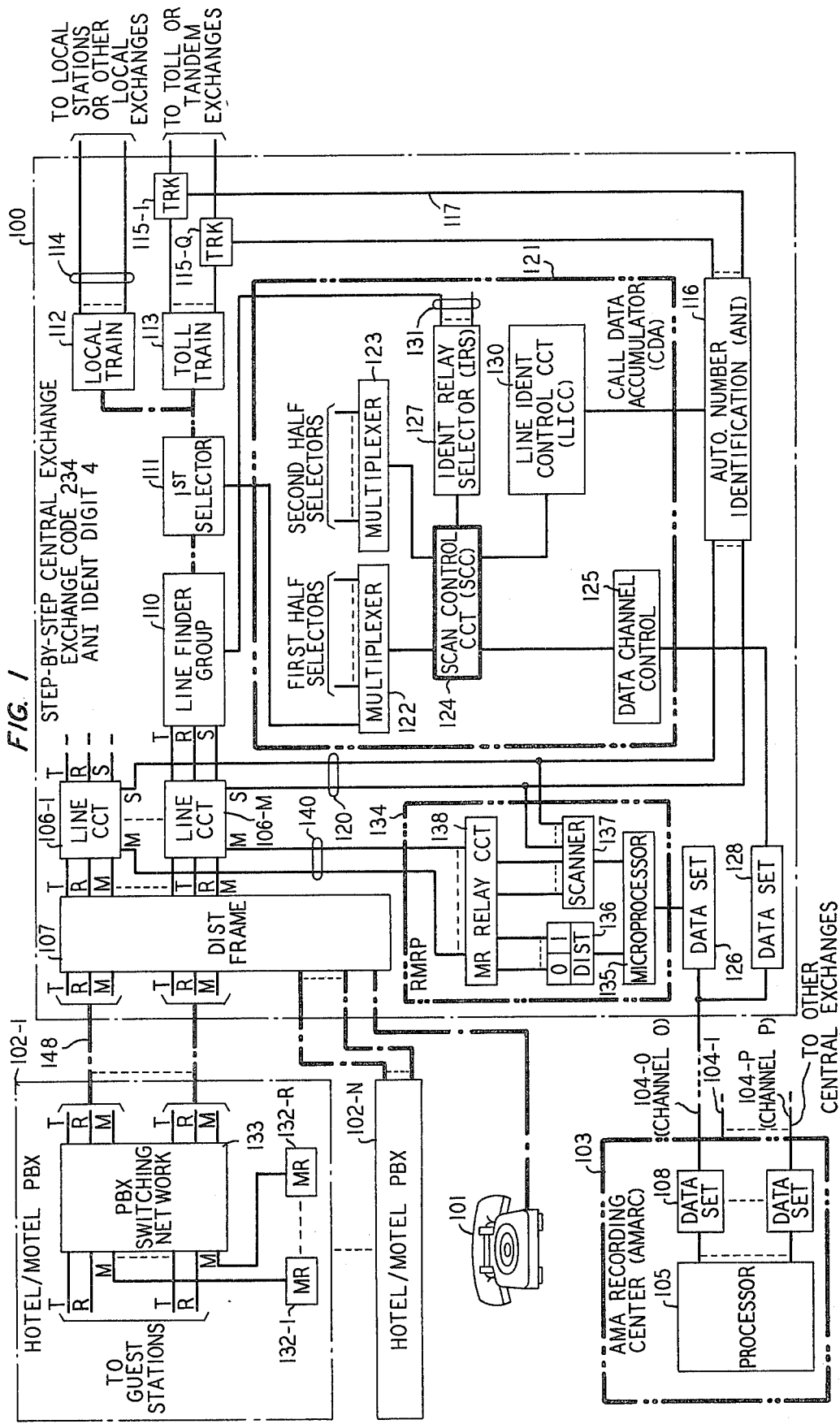
FIG. 1 illustrates in block form a telephone system comprising a local step-by-step central exchange, a number of hotel/motel private branch exchanges served by the central exchange, and a remote accounting center which stores billing information pertaining to local calls in the central exchange. The central exchange includes automatic subscriber identification equipment, a call data accumulator which transmits call answer and disconnect messages to the accounting center, and a message register pulsing circuit which receives information from the remote accounting center for pulsing guest message registers at the hotel/motel private branch exchanges.

The illustrative system shown in FIG. 1 includes a step-by-step central telephone exchange 100, a telephone station 101, which represents all private individual stations served by exchange 100, a plurality of hotel/motel PBXs 102-1 to 102-N, and finally, a remote processing center 103 which is identified as the automatic message accounting and recording center (AMARC). Exchange 100 is assumed to be identified by the exchange code digits 234 and is illustratively of a type serving a small number of telephone subscribers so that the provision in the exchange of automatic message accounting (AMA) facilities is not economically justified. In such exchanges it is the common practice to route conventional toll calls to foreign tandem or toll exchanges which are equipped with AMA facilities to provide itemized billing to subscribers for toll calls.

For local calls, which are processed entirely by exchange 100, or by exchange 100 in conjunction with another local exchange (not shown), AMARC 103 provides a centralized means for accumulating itemized usage-sensitive local call billing. AMARC 103 communicates with central exchange 100 by means of a data channel 104-0, also referred to herein as channel 0, and with other similar exchanges (not shown) by the data channels 104-1 to 104-P. A processor 105 in AMARC 103 communicates with and receives from the exchanges answer and disconnect messages which include the telephone numbers of calling and called subscribers. In response to called subscriber answer messages, AMARC 103 initiates timing operations to time the duration of the calls. At the termination of the calls, indicated by the receipt of disconnect messages, AMARC 103 performs translation operations to determine the appropriate call charging rates to be used based on the distance between calling and called parties and it enters billing data on magnetic tape based on the rates and call durations. The tape is processed at a later time when billing statements are prepared for each of the subscribers served by the local exchanges.

Exchange 100 comprises a plurality of line circuits 106-1 to 106-M which are associated individually by distributing frame 107 with incoming subscriber lines. The line circuits are divided into groups and each group is served individually by a line finder group such as, for example, line finder group 110 consisting of a lesser plurality of line finders. The line finders connect to first selectors in exchange 100, which are represented here by first selector 111. Depending upon whether or not a local or toll call is in progress, first selector 111 connects a calling subscriber either to a local switching train 112 or to a toll switching train 113. The local train 112 connects the subscriber via one of the lines or trunks 114 to the desired called station or terminating exchange. The toll train 113, on the other hand, connects the calling subscriber by means of one of the trunk circuits 115-1 to 115-Q to a tandem or toll exchange having AMA facilities.

Assuming that a toll call is in progress and that it is routed by means of trunk circuit 115-1, the tandem or toll exchange connected thereto returns a supervisory signal to the trunk circuit when the called subscriber answers. Exchange 100 responds to the signal by identifying the calling subscriber and by forwarding the identification to the tandem or toll exchange for billing purposes. Specifically, trunk circuit 115-1 responds to the answer supervision signal by activating automatic number identification (ANI) equipment 116. ANI equipment 116 thereupon applies a signal to connection 117. The signal is extended through trunk circuit 115-1 and through the established connections in toll train 113, the first selector represented by 111, and a line finder in group 110 to a sleeve lead S at one of the line circuits 106-1 to 106-M associated with the call. From the line circuit, the signal is applied via the S lead to one of the inputs 120 of ANI equipment 116 which uniquely identify the calling subscriber. ANI equipment 116 scans its 120 inputs until it locates the signal. It then translates the appearance number of the input into an identification number of the calling subscriber and outputs the number, including an exchange identification digit, assumed to be the digit 4 for this discussion, via connection 117 and trunk circuit 115-1 to the tandem or toll exchange. In this manner the tandem or toll exchange acquires the information necessary to charge the calling subscriber.

For a local call in exchange 100, the call data accumulator (CDA) 121 supplies AMARC 103 with the subscriber identification information for billing the local call. CDA 121 comprises multiplexers 122 and 123 which monitor the tip T, ring R, and sleeve S leads at the input of the first selectors represented by 111. Effectively then, the multiplexers monitor the state of the line finders in the line finder groups represented here by group 110. Multiplexer 122 is assigned to a first half of the line finders and multiplexer 123 is assigned to a second half of the line finders. The multiplexers monitor voltage and current relationships on the T, R and S leads and convert the relationships into binary encoded signals, called thresholds, which are sequentially transmitted to a scan control circuit (SCC) 124. SCC 124 maintains in its memory a current state for each line finder monitored based on the last state and detected threshold from each line finder. In this manner it monitors the progress of calls from idle to off-hook, to cut-through, to answer and, finally, to disconnect of the calling and called subscribers. Answer and disconnect messages generated by SCC 124 in response to the detection of the appropriate thresholds are communicated to AMARC 103 by means of data channel control 125, data set 128 and data channel 104-0 along with calling subscriber identification information.

The identification relay selector (IRS) 127 and the line identification control circuit (LICC) 130 are both controlled by SCC 124 to operate with ANI equipment 116 to acquire the identification information. Specifically, upon detection of an answer state at a line finder, SCC 124 controls IRS 127 to apply a signal to the appropriate one of leads 131 associated with the line finder serving the call in question. The signal is then applied to the S lead extending through one of the line circuits 106-1 to 106-M to one of the inputs 120 of ANI equipment 116. SCC 124 also controls LICC 130 to initiate operations of ANI equipment 116 such that it scans the inputs 120 to locate the signal. ANI 116 translates the signal appearance into the subscriber identification and transmits the identification to LICC 130 which, in turn, transmits it to SCC 124. The calling subscriber identification is included in an answer message generated by SCC 124, along with the called number and a line finder address in SCC 124, and transmitted to AMARC 103. The line finder address is referred to as a scan port address (SPA), which is a unique number assigned to each of the monitoring inputs of multiplexers 122 and 123 from the first selectors, and which is used by SCC 124 to scan the desired line finder at the appropriate time. AMARC 103 responds to the answer message by initiating timing operations to time the duration of the call. At a subsequent time when a disconnect message associated with the same call is received from SCC 124, AMARC 103 initiates a billing entry onto magnetic tape in accordance with the call duration and distance which it has determined from a translation of the calling and called subscriber numbers.

For local calls made by guests of the hotel/motel 102-1 to 102-N, the operations of CDA 121 and AMARC 103 described above, are performed so that billing entries chargeable to each hotel/motel in question may be subsequently prepared. In addition, guest message registers, such as 132-1 to 132-R at PBX 102-1, must be incremented in order that the hotel/motel may properly charge the guests for such calls. For this purpose a remote message register pulser (RMRP) 134 at exchange 100 operates to supply message register pulses to appropriate ones of the M-leads 140. These M-leads extend through respective ones of the line circuits 106-1 to 106-M which are associated with hotel/motel PBXs, and from the line circuits through distributing frame 107 to one of the hotel/motel PBX switching networks such as 133 of PBX 102-1. An M-lead associated with a call in progress is connected by the PBX switching network to a network input appearance associated with the calling guest. The input appearance is connected to an individual message register such as 132-1. In order that the charging information outpulsed to the hotel/motel message registers be consistent with the billing information stored by AMARC 103, provision is made for AMARC 103 to control RMRP 134 in the generation of message register pulses. This is accomplished as follows. Upon receipt of an answer message from CDA 121, AMARC 103 determines from the calling subscriber number that the call is from a hotel/motel guest, and, from translation tables, the pulsing address in RMRP 134 associated with the PBX trunk line, such as 148, on which the call is in progress. AMARC 103 further determines from data in its memory an initial time period and an initial number of message register pulses for that time period which are to be registered in the guest message register. The pulsing information and the pulsing address are transmitted by means of data channel 104-0 to exchange 100 where data set 126 gives the information to RMRP 134. This information transmitted to RMRP 134 is also received by CDA 121 via data set 128. As will be described in more detail, however, different encodings of the commands for RMRP 134 and CDA 121 allow CDA 121 to ignore commands directed to RMRP 134. Concurrently with these operations, AMARC 103 initiates timing operations based upon the initial billing period determined from its memory.

RMRP 134 comprises a microprocessor 135, a distributor 136 and scanner 137, the latter two of which connect to a message register relay circuit 138. Processor 135 controls distributor 136 to operate relays in relay circuit 138 which are associated with message registers to be pulsed. Each operation of a relay in circuit 138 results in the incrementing by 1 of the message register connected to the associated PBX trunk line, such as 148, by a PBX network. Microprocessor 135 monitors the operations of pulsing relays in circuit 138 by means of scanner 137, which contains passive state sensing devices. In addition, as will be seen, microprocessor 135 also monitors the S leads of PBX trunk lines to which it is pulsing by means of scanner 137 to detect if a calling guest terminates a call before pulsing is completed to the guest message register.

At the expiration of an initial timing period for a hotel/motel guest call, AMARC 103 determines from its memory an appropriate overtime charging period and the number of message register pulses to be charged for the overtime period. AMARC 103 then transmits another message containing this information to RMRP 134. RMRP 134 thereupon processes this information in the same manner as just described to distribute the required number of pulses to the identified M-lead.

When a hotel/motel guest call is terminated in exchange 100, CDA 121 transmits a disconnect message to AMARC 103 exactly as it would for any other disconnect from, for example, a station 101. Upon receipt of the disconnect message, AMARC 103 stores on magnetic tape an entry containing the accumulated number of message units associated with the call timing and other information pertaining to the call. In this manner the appropriate usage-sensitive charging information stored by AMARC 103 for hotel/motel local calls is consistent with information stored in the hotel/motel guest message registers used by the hotel/motel to charge the guests.

DETAILED DESCRIPTION

A detailed description of the operation of the illustrative system in FIG. 1 will be made generally by describing the operations pertaining to a typical hotel/motel local call completed by exchange 100. First, however, it is desirable to explain in more detail the operation of CDA 121. CDA 121 is controlled by the scan control circuit (SCC) 124, which maintains a system state for each line finder in exchange 100 which it monitors. Each line finder is assigned to an individual monitoring address, referred to as a scan port address (SPA). In the preferred, illustrative embodiment, 512 such SPAs are provided, of which 496 are assigned for monitoring line finders and the remaining 16 are assigned for maintenance and testing purposes. SCC 124 cyclically addresses each one of these SPAs and uses the associated line finder status and the current system state for the SPA in question to update the SPA system state. As will be seen in more detail, SCC 124, in this manner, follows the progress of calls on any of the monitored line finders.

Figure 2:
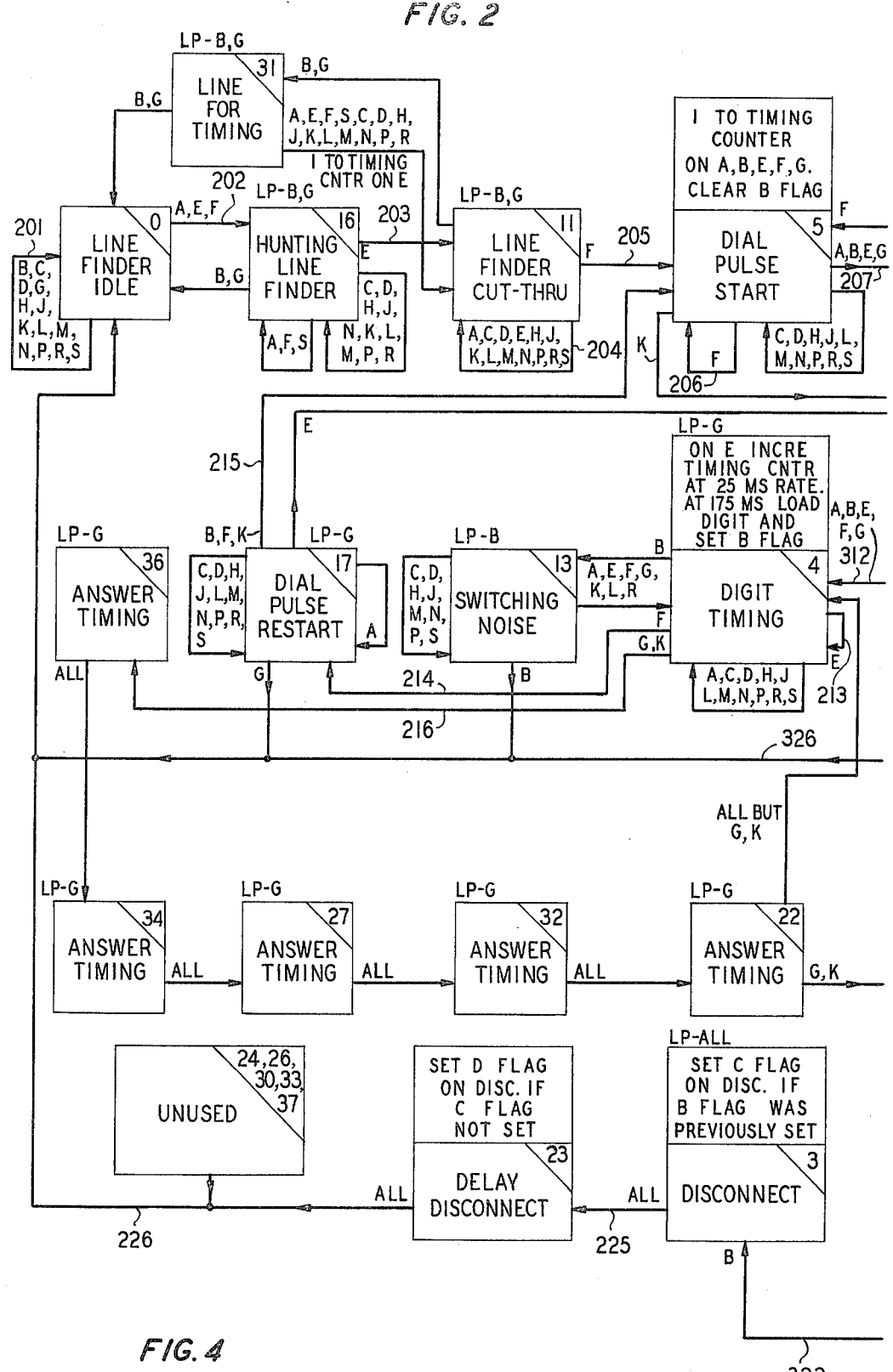
FIGS. 2 and 3, when arranged according to FIG. 4, disclose a state diagram of the control circuit of the call data accumulator.
Figure 4:
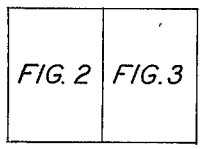
Figure 3:
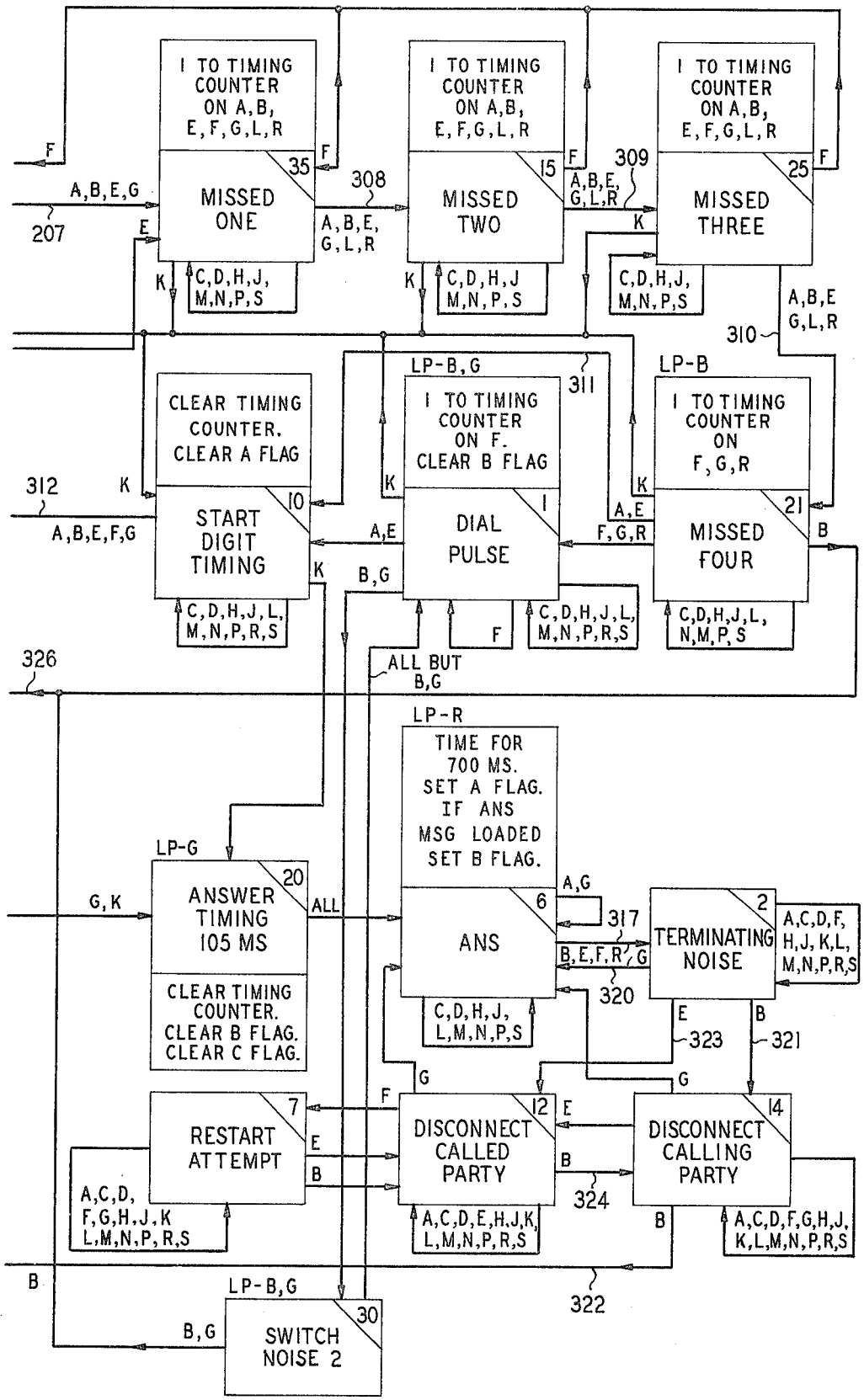
Figure 6:
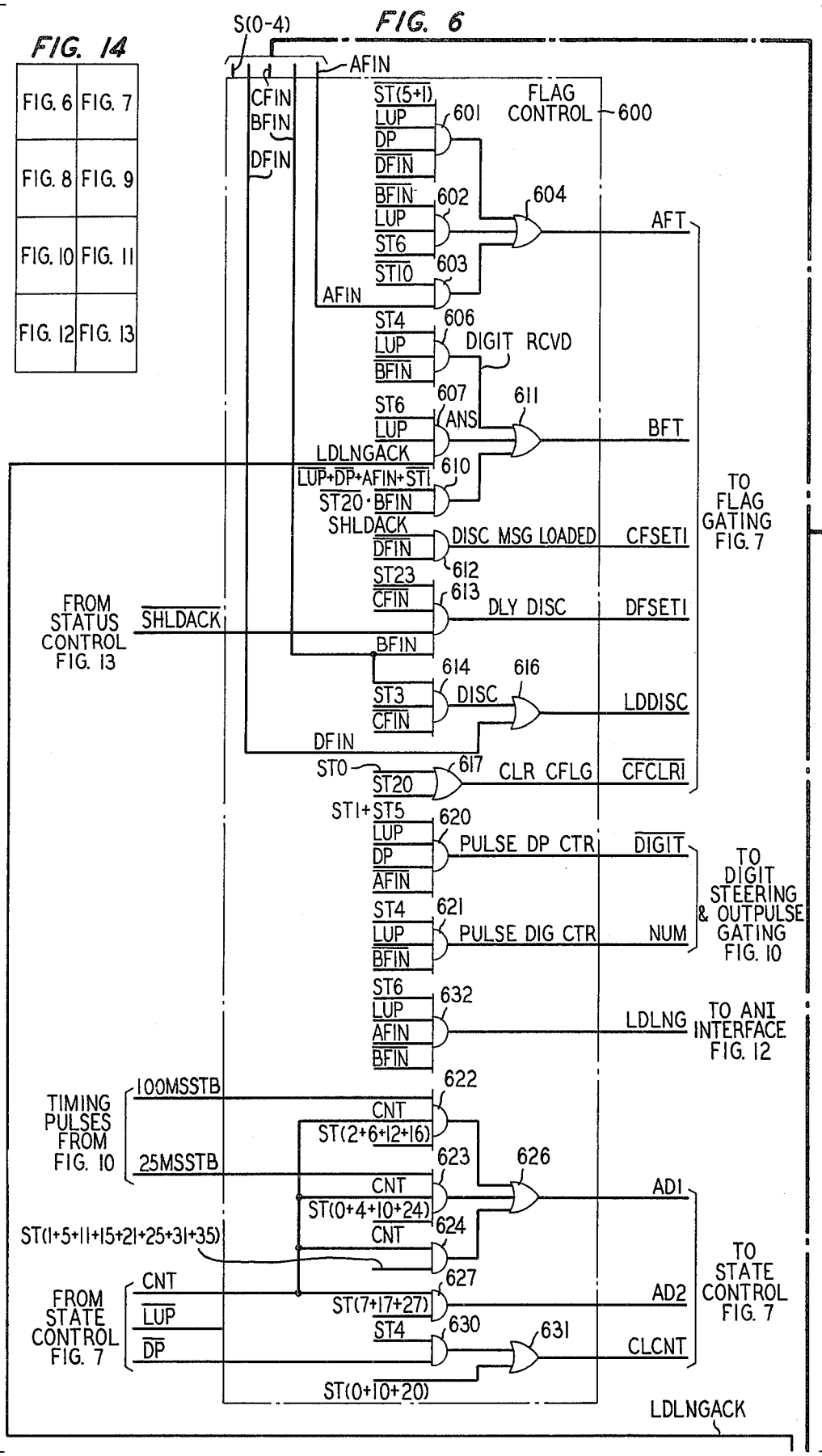
FIGS. 6 through 13, when arranged according to FIG. 14, disclose the details of the control circuit of the call data accumulator.

A state diagram pertaining to the system state maintained by SCC 124 for any individual line finder of exchange 100 is shown in FIGS. 2 and 3 when arranged according to FIG. 4. The concept of using and a formal description of state diagrams as a tool for illustrating the operations of logic circuits is set forth in Mealy, *A Method for Synthesizing Sequential Circuits,* 34 *Bell System Technical Journal,* 1045 (1955). Discussions of state diagrams may also be found in any introductory logic circuit design text. Each box in FIGS. 2 and 3 having a triangle in its upper right corner represents one individual state that may be acquired by any of the 512 SPAs. A state number, in octal designation, is shown in each triangle. Comment boxes, not having such a triangle, are included with some state boxes as an aid to the reader. The notation LP-X, where X is a variable, appearing above certain state boxes, indicates that provision is made in SCC 124 for looping, or holding, that state for three successive scan cycles of SCC 124 so long as the threshold X associated with the line finder and SPA in question is received from the appropriate multiplexer 122 or 123. The thresholds, which are binary encoded representations of the state of the tip, ring and sleeve leads of the associated line finder, are shown in the table of FIG. 5. For convenience, the thresholds are designated by selected letters in the range A through S, and are used to define the conditions of state transfer in the state diagram of FIGS. 2 and 3. Specifically, the arrows entering and leaving each state box in FIGS. 2 and 3 represent state transitions into and out of the state in question. The threshold letters associated with each of these arrows indicates the specific threshold received from a multiplexer which causes the indicated state transition. One difference between the state diagram in FIGS. 2 and 3, and the state diagrams discussed in logic circuit design texts is the omission here in the state diagram of output functions of SCC 124 associated with the state transitions. These output functions are too complex for inclusion in the state diagram, and are discussed instead at appropriate places in the following discussion. For completeness, the complete state diagram for any SPA of SCC 124 is shown in FIGS. 2 and 3, including all state transitions. All states and all transitions are not relevant for this discussion, however, the great majority of state transitions being for coping with abnormal and noise conditions occurring on line finder connections and causing spurious thresholds to be returned to SCC 124. In general, the operation of SCC 124 is described without consideration of the states and state transitions associated with these spurious conditions.

FIGS. 6 through 13, when arranged according to FIG. 14, disclose the operative details of SCC 124 and are used in conjunction with the state diagram to explain the operation of SCC 124 in the following discussion. The following conventions are used to simplify these figures. A plurality of leads between circuits may be shown as a single connection with a designation such as NS(0-4) for example. NS(0-4) is an output of a state control circuit 700 in FIG. 7. This illustrative designation is to be interpreted as 5 leads having the respective designations NS0, and NS1 through NS4. In addition, certain logic circuits are represented by a single gate having inputs which bear boolean expressions representing the logic function present on the input. A logic circuit to generate the logic function is not shown since the realization of an appropriate logic circuit to generate the function is well within the skill of any art worker. For example, in FIG. 6, the symbolic AND gate 610 has 2 inputs. The boolean expression associated with the upper input is $\overline{LUP} + \overline{DP} + AFIN + \overline{ST1}$. The + symbol represents the "OR" logic function. $\overline{LUP}$ is the logical complement of LUP. ST1 is generated when SCC 124 is in state 1 for a SPA then being scanned by SCC 124. Thus, $\overline{ST1}$ is low when state 1 is present and high when state 1 is not present. The boolean expression above therefore means that a high signal is present on the upper input of gate 610 when LUP or DP is low, or when AFIN is high, or when *state 1 is not* present. As another example, the notation $\overline{ST(5+1)}$ appearing on the upper input of gate 601 represents the logic function $\overline{ST5} + \overline{ST1}$, which is equivalent to $\overline{ST5}$ "AND" $\overline{ST1}$. This means that a high signal is present on that input when the SPA being scanned is not in state 5 and not in state 1.

Figure 7:
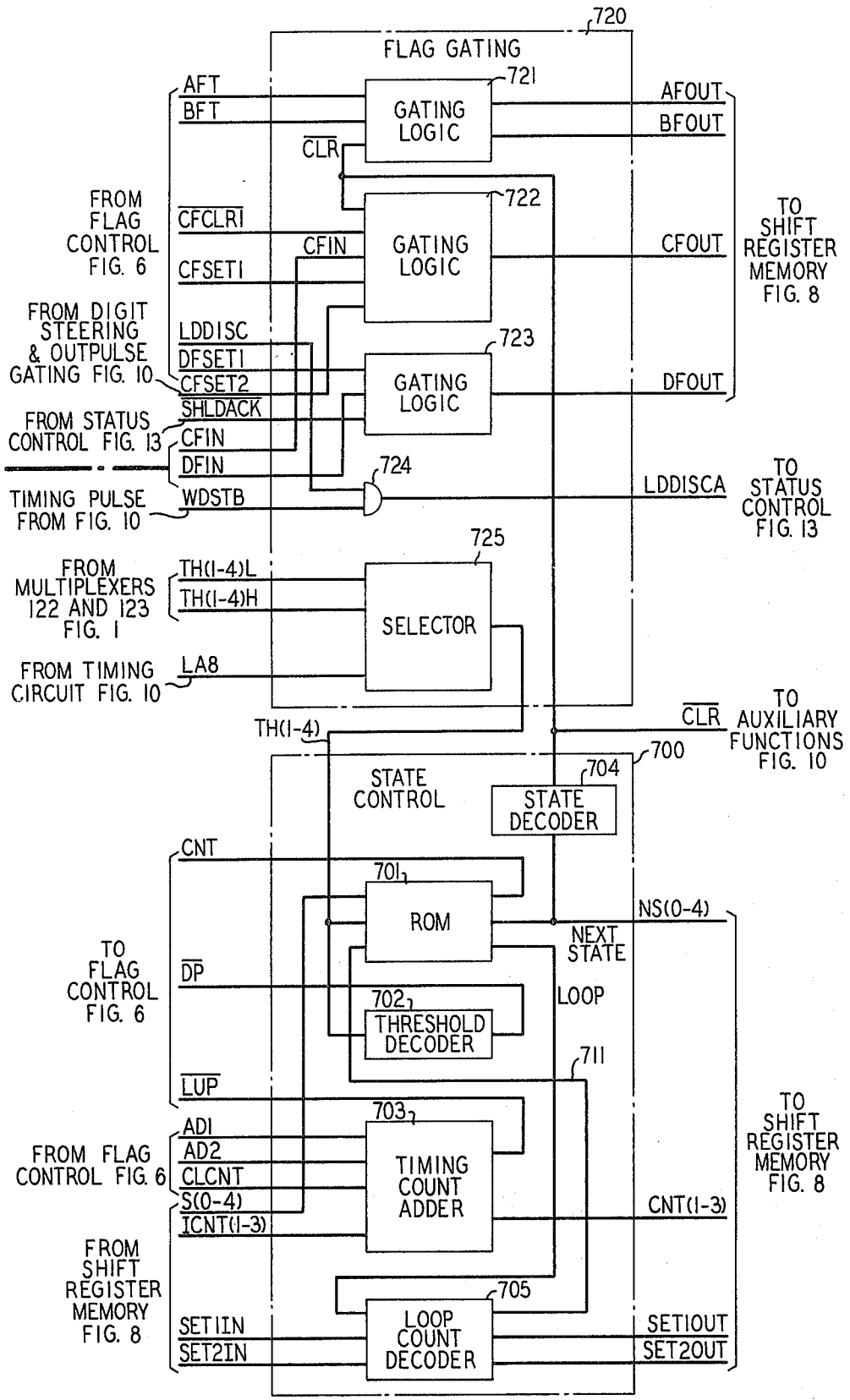

FIG. 7 shows the state control 700 of SCC 124. It consists primarily of a read-only-memory (ROM) 701 whose output appearing on leads NS(0-4) consists of next state signals which correspond to one of the state numbers in FIG. 2. ROM 701 is addressed by signals appearing on input leads S(0-4) representing the current state associated with a SPA in question and by threshold signals appearing on input leads TH(1-4) repesenting the line finder state of the SPA in question. The threshold signals on leads TH(1-4) are selected by selector 725 from the threshold signal leads TH(1-4)L and TH(1-4)H from respective multiplexers 122 and 123 in accordance with signals on lead LA8 defining whether the SPA currently being scanned is in the lower or upper half of the 512 SPAs. The threshold signals are combined with the current state signals to produce an address to ROM 701 whose output then represents the next state to be acquired by this SPA. For some states, the ROM output may contain a LOOP signal and/or a CNT signal which appears on the output leads so designated. The LOOP signal is generated for those states labeled with the designation LP-X in FIGS. 2 and 3 and, as will be explained, causes SCC 124 to maintain that state for 3 consecutive scan cycles before allowing a transfer to another state if the threshold X persists for the 3 scan cycles. The CNT signal indicates that the state in question is one in which a timing function must be performed, such as for timing the receipt of dial pulses or a calling party answer condition. Timing count adder 703 is used to perform these timing functions whenever signal CNT is present, as will be explained in more detail in the following discussion.

Figure 8:
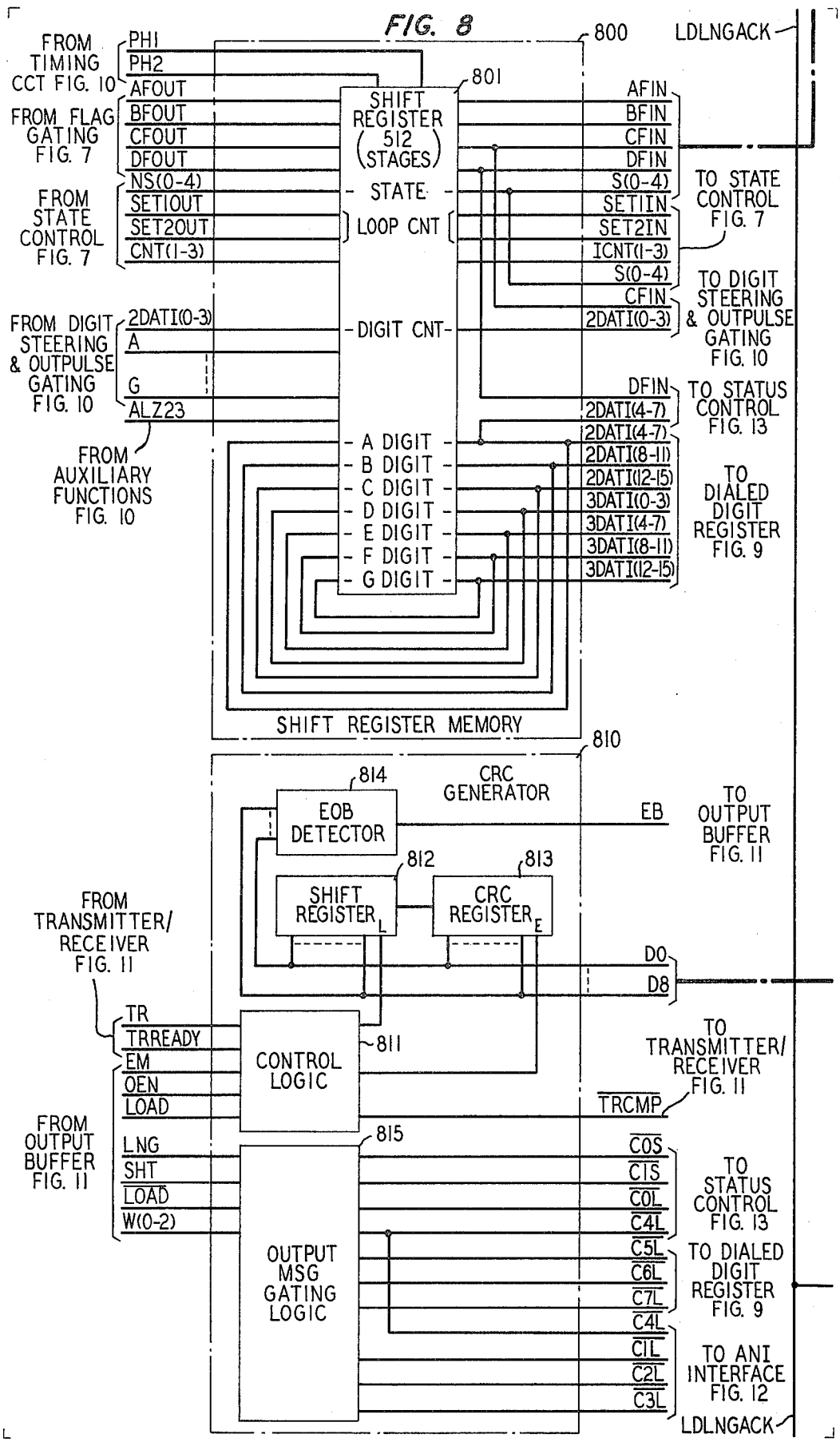
Figure 9:
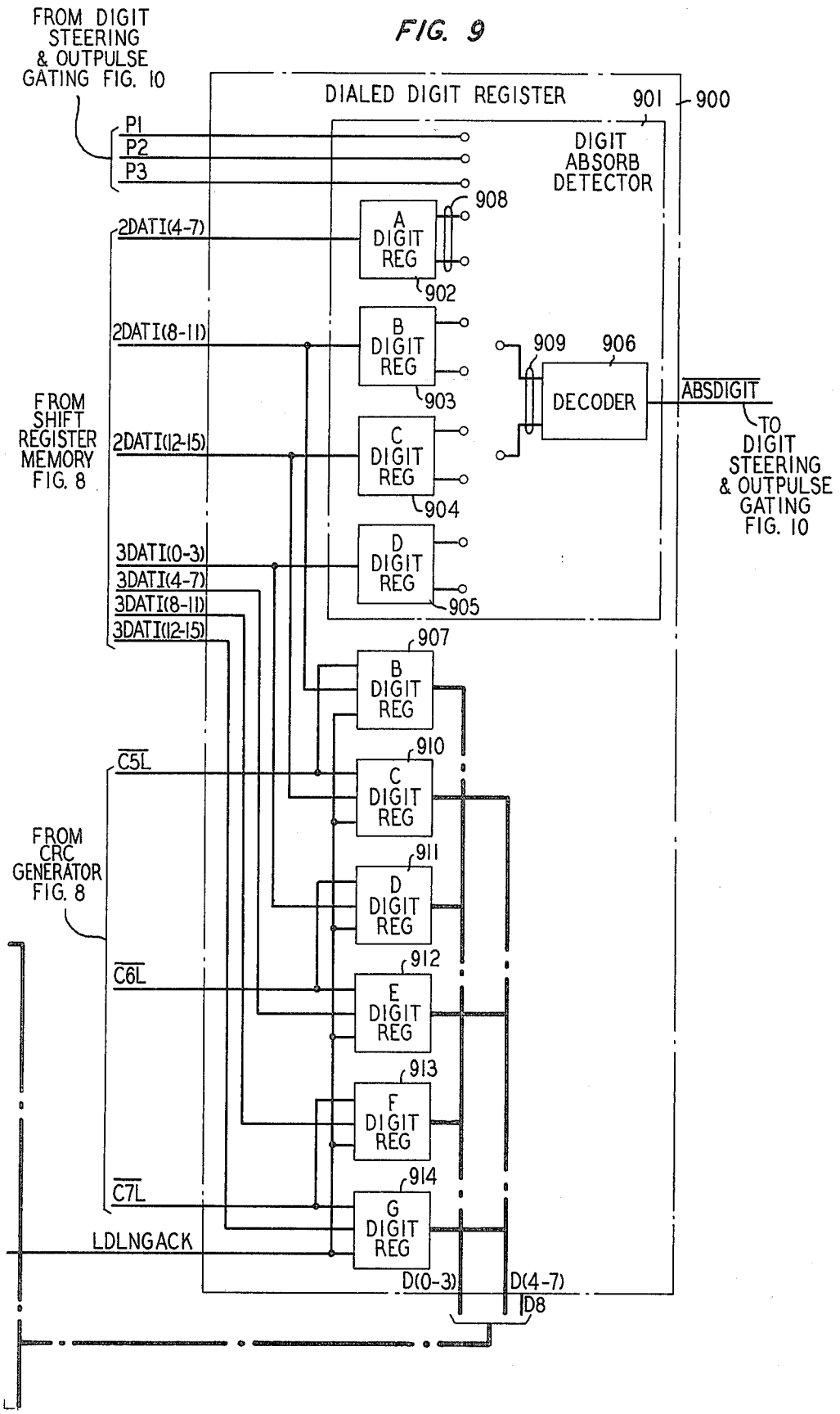
Figure 10:
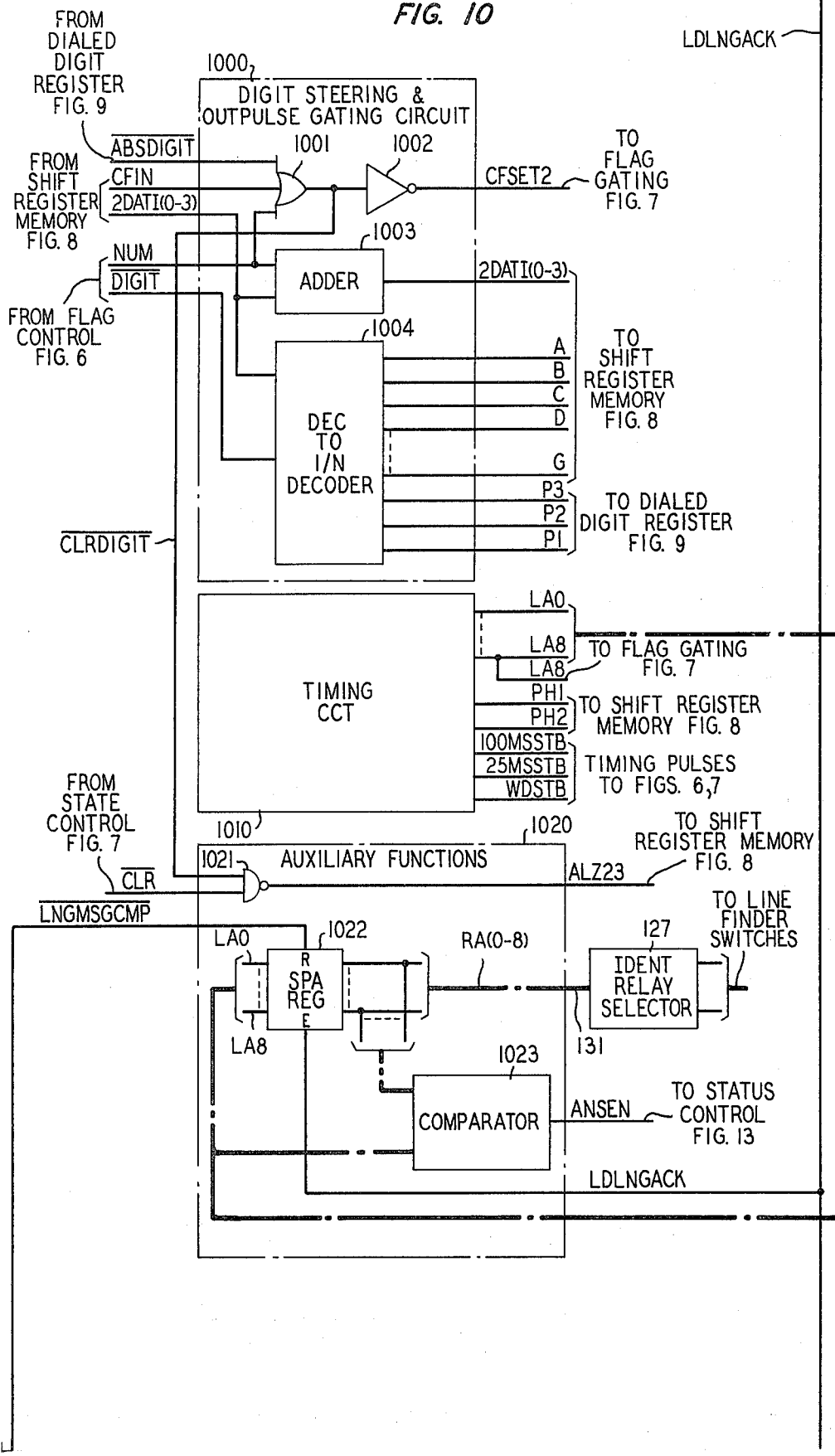

FIG. 8 discloses a shift register memory 800 in which is maintained the current state and other information pertaining to each of the 512 SPAs. Memory 800 contains a 512 stage shift register 801 with each stage being assigned to a corresponding one of the SPAs. For example, stage 0 is assigned to SPA 0 and stage *i* is assigned to SPA *i*. The SPAs are each sequentially addressed during 1 scan cycle of SCC 124. The address signals defining the SPA being addressed at any given time appear on leads LA0 to LA8 from timing circuit 1010 in FIG. 10 and, of course, are synchronized with the stage present at the output leads of shift register 801 which appears on the right side of memory 800. Thus, if SPA *i* is being addressed, as defined by the signals on leads LA0 to LA8, then the contents of shift register stage *i* are present on the ouput leads from shift register 801. The shifting operations of register 801 are under the control of dual phase clock signals appearing on leads PH1 and PH2 from timing circuit 1010. The signal on PH1 illustratively occurs at approximate 19.5 microsecond intervals. The signal on PH2 occurs at the same rate, but 180 degrees out of phase with the PH 1 signal. A shifting operation of register 801 is activated by either clock signal. Thus, a full scan cycle through all 512 stages of register 801 consumes approximately [19.5/2] × 512 microseconds, or approximately 5-milliseconds. The 5-millisecond scan cycle is used by SCC 124 to perform certain timing operations as will be seen.

After the information in register 801, pertaining to the SPA currently being scanned, is processed and updated by SCC 124, the updated information is shifted back into register 801 at its input leads. For each SPA, shift register 801 stores the current state received on its input leads NS(0-4) from state control 700. Each stage provides slots for storing seven digits A through G of a called subscriber number associated with the line finder which is monitored at the SPA in question. The inputs for these digits appear in FIG. 8 on leads 2DATI(4-15) and 3DATI(0-15). As shown in FIG. 8, these inputs are connected only to the associated outputs of shift register 801. The digit information is entered into the appropriate digit slot of a stage by means of input control leads A through G from a digit steering and outpulse gating circuit 1000 in FIG. 10. Each of these signals is associated with the corresponding one of the A through G-digit slots of shift register 801 and a signal thereon activates logic (not shown) in register 801 which increments the contents of the appropriate digit slot by 1. Thus, the connections from the digit outputs to the digit inputs of register 801 serve only to circulate the contents of the digit slots in order to preserve the received digits, whereas the digits are entered into the slots in the first instance by incrementing signals on the control leads A-G.

A digit counter is also provided in register 801 having inputs on leads 2DATI(0-3) from the digit steering and outpulse gating circuit 1000. That circuit contains an adder 1003 which receives the current contents of the digit counter from register 801 output leads 2DAT(0-3). Adder 1003 increments the count at the appropriate time, as will be described, and reinserts the new digit count back into register 801 on the input leads 2DATI(0-3). Thus, if digits A and B have been received from a calling subscriber, for example, the value of the digit counter would be equal to 2.

Single bit slots are provided in register 801 for control flags A through D. The input signals associated with these flags appear, respectively, on input leads AFOUT through DFOUT. The output of register 801 associated with these flags appears, respectively, on output leads AFIN through DFIN. Briefly, the A flag is set while SCC 124 is engaged in counting dial pulses for a digit being dialed by a calling subscriber, and also during a timing operation performed after a calling subscriber answer threshold has been received to ensure that the answer threshold is indeed genuine. The B flag is set to indicate that a dialed digit has been fully received and also when an attempt to load an answer message for transmission to AMARC 103 has been successful. The C flag is set to indicate that dialed digit absorption has occurred and also when a calling or called subscriber disconnect message has been successfully loaded for transmission to AMARC 103. The digit absorption function is explained in detail hereinafter. The D flag is set only when an attempt to load a disconnect message for transmission to AMARC 103 has been unsuccessful. This causes SCC 124 to thereafter attempt to load what is called a "delayed disconnect" message for transmission to AMARC 103.

Finally, storage is provided in register 801 for a count of the number of scan cycles which have been executed by SCC 124 when the LOOP feature, described briefly above, is activated.

DESCRIPTION OF AN ILLUSTRATIVE HOTEL/MOTEL LOCAL CALL

The remaining circuits of SCC 124 are explained at the appropriate times during the following discussion in which the progress of a typical call is discussed. Assume that a guest at hotel/motel PBX 102-1 associated with message register 132-1, wishes to place a local call to a subscriber served by exchange 100 and whose station number is identified by the digits 234-5678. Assume further that the call is switched to trunk line 148 by PBX network 133 and is served by a line finder 0 (not shown), assigned to scan port address (SPA) 0 in CDA 121, in line finder group 110 of exchange 100. The trunk line 148 is illustratively identified by ANI 116 by the digits 1111. Assume further that immediately before the call is placed, line finder 0 is in an idle state. In this case, the threshold B (see FIG. 5) is transmitted by multiplexer 122 for SPA 0 each time SCC 124 addresses this SPA. Threshold B corresponds to an open loop without the presence of sleeve ground. In this event, SCC 124 is in system state 0 for SPA 0 as shown in FIG. 2. This is indicated by low signals appearing on register 801 output leads S(0-4) each time SPA 0 is scanned. These low signals together with the B threshold received from multiplexer 122 on each scan of SPA 0 results in low signals on the next state output leads NS(0-4) from ROM 701, which are shifted back into the state storage of register 801 to maintain a current state of 0 for the next scan of SPA 0. The 0 state remains so long as the on-hook threshold B is received for SPA 0. This condition is illustrated by state transfer path 201 in FIG. 2.

Assume now that the guest subscriber in question goes off-hook. Line finder 0 begins to hunt for the off-hook incoming connection, but has not yet cut-through. Accordingly, on the next scan of SPA 0, the threshold A is received from line finder 0, which corresponds to a closed loop condition without sleeve ground. In response, SCC 124 transfers from state 0 to the "hunting line finder" state 16, as shown by state transfer path 202 in FIG. 2. The signals on ROM 701 output leads NS(0-4) reflect the new state 16 and these signals are transferred to the state storage in shift register 801. By the time SCC 124 scans the remaining SPAs and returns to scan SPA 0 again, line finder 0 will have located the subscribers input appearance and will have established a cut-through condition to a first selector 111 in FIG. 1. At this time, threshold E, corresponding to a closed loop with the presence of sleeve ground, is received from multiplexer 122 and that threshold combined with the state 16 signals on leads S(0-4) from register 801 cause a transfer to the "line finder cut-through" state 11 (transfer path 203).

SCC 124 remains in state 11 (transfer path 204) for each of the subsequent times that SPA 0 is scanned until the calling subscriber begins to dial the digits of the called subscriber. As soon as the calling subscriber does so, threshold F (open loop with sleeve) is received from multiplexer 122 signifying the presence of the first dial pulse of the first digit being dialed. Threshold F combined with the current state 11 produces a transfer (path 205) to the "dial pulse start" state 5. While in state 5, SCC 124 times the duration of receipt of threshold F for 35 milliseconds to verify that a genuine dial pulse is received and not just noise signals. The timing operation is performed as follows. ROM 701 is programmed so that when it produces state 5 output signals, it also produces a signal on its CNT output. The CNT signal is extended to AND gate 624 in the flag control circuit 600. The lower input of gate 624 is enabled when SCC 124 is in state 5. Thus, on each scan in which the CNT lead is high, gate 624 produces a signal on the output lead AD1 from OR gate 626, which is extended to state control 700. In the meantime, the timing count, which is initially 0, stored in the timing count storage of register 801 is received by timing count adder 703 on leads ICNT(1-3). The signal on lead AD1 causes adder 703 to increment the timing count by 1, and the new count is reinserted into register 801 on leads CNT(1-3). This incrementing of the timing count occurs every 5 milliseconds by virture of the 5 millisecond scan cycle of SCC 124. Timing count adder 703 contains logic to inhibit further incrementing of the timing count when the count state it receives from register 801 becomes equal to 7, designating an elapsed timing interval of 35 milliseconds. At this time a low signal is produced on lead $\overline{LUP}$ from adder 703 to indicate that the timing interval has expired. The complement of this signal is received by gate 601. An input DP to gate 601 is received from the threshold decoder 702 in state control 700 and reflects the fact that dial pulse threshold F is present for SPA 0. Since SCC 124 is in state 5 and LUP is high, gate 601 generates a signal on the AFT lead from OR gate 604 to set the A control flag. The AFT lead is extended to gating logic 721 in the flag gating circuit 720, which controls the generation of a signal on lead AFOUT. AFOUT is extended to the shift register 801 and sets the A flag to signify that a dial pulse has been received. On subsequent scans of SPA 0, the A flag output signal appearing on register 801 output lead AFIN enables gate 603 so that the A flag in register 801 is maintained set until gate 603 is disabled by means of its upper input $\overline{ST10}$ which is low in state 10. This is described further below.

Since the first dialed digit is in the process of being received, the shift register 801 digit counter, whose output is on leads 2DAT(0-3), is equal to 0 at this time. This output is extended to a "decimal to 1/N" decoder 1004 in the digit steering and outpulse gating circuit 1000, which controls the incrementing of the digit storage slots in register 801. At the same time, a signal appears on lead $\overline{DIGIT}$ to decoder 1004 from gate 620 of the flag control circuit. This signal is generated by gate 620 because SCC 124 is in state 5, the LUP and DP inputs are both high as above described, and the control flag A signal $\overline{AFIN}$ will not be low until the next scan of SPA 0. In response to the $\overline{DIGIT}$ signal, decoder 1004 decodes the digit count state, which is now 0, to generate a signal on its output lead A. This signal is applied to the A control input of shift register 801 to increment the A digit storage therein by 1. Since that storage was assumed to be 0 at the beginning of the call, the A digit storage now contains the value 1 for the first dial pulse of the first digit which has been received.

The dial pulse threshold F from SPA 0 may persist long after the dial pulse count is registered as above. To prevent the A digit storage from being improperly incremented on successive scans of SPA 0 while the threshold F is present, gate 620 is disabled by its lower input $\overline{AFIN}$ on the subsequent scans.

SCC 124 remains in state 5 until the dial pulse threshold F disappears. It is assumed that the normal closed loop threshold E reappears without the receipt of any other thresholds that might be generated due to noise conditions. Under these circumstances, SCC 124 is advanced on the next scan of SPA 0 to state 35 (transfer path 207). States 35, 15, 25 and 21 are designed primarily for coping with noise conditions in threshold transitions. In this discussion where noise conditions are not being considered, these states merely consume 5 milliseconds each for each scan cycle and perform no other useful function. Thus, on subsequent cycles SCC 124 progresses from state 35 to state 15, then to states 25 and 21 via the respective transfer paths 308, 309 and 310, and then to the "start digit timing" state 10 (transfer path 311) approximately 20 milliseconds after the first dial pulse threshold was terminated.

In state 10, interdigital timing is initiated so that subsequent dialed digits may be distinguished from dial pulses. First, the A control flag is cleared, by disabling the A flag sustaining gate 603, to prepare for the receipt of another dial pulse. This is accomplished by the input $\overline{ST10}$ to gate 603. The timing count storage in register 801 is set to 0 by low signals on leads CNT(1-3) from timing count adder 703 as a result of a signal appearing on lead CLCNT to the adder. This signal is generated by gate 631 whose lower input is activated by state 10. On the next scan cycle, assuming that threshold E persists, SCC 124 transfers to the "digit timing" state 4 (transfer path 312). Interdigital timing is performed in state 4 by using timing count adder 703 to count at 25-millisecond intervals. This result is accomplished by using gate 623 to generate a count signal on lead AD1 only every 25 milliseconds. The inputs to gate 623 consist of a lead 25MSSTB from timing circuit 1010 on which appear clock pulses at a 25-millisecond rate. The middle input CNT contains a high signal from ROM 701 when SCC 124 is in state 4, and the lower input of gate 623 is enabled by state 4. Accordingly, gate 623 provides an output signal from gate 626 on lead AD1 each time the 25-millisecond clock signal 25MSSTB is received. So long as threshold E persists, SCC 124 remains in state 4 (transfer path 213) and updates the timing count in register 801 until a count of 7 (175 milliseconds) is achieved. At that point it is determined that a genuine interdigital period has been detected. In this event, a signal appears on lead $\overline{\text{LUP}}$ from timing count adder 703, as was described above for dial pulse timing, and further counting by adder 703 is inhibited. For the call under discussion, however, only the first dial pulse of the first digit 2 has been received. Before the 175-millisecond interdigital timing interval expires, therefore, the second dial pulse arrives and the threshold for SPA 0 changes from E to the dial pulse threshold F. It is seen in FIG. 2 that in this circumstance, SCC 124 transfers (path 214) from state 4 to the "dial pulse restart" state 17 on the next scan cycle, and on the succeeding cycle from state 17 to the "dial pulse start" state 5 (path 215) to receive the next dial pulse.

The above actions are repeated by SCC 124 during the reception of the second dial pulse of the first digit 2. This time, however, the interdigital timing period will expire in state 4 to indicate completion of reception of the first digit. The B control flag is set during state 4 to indicate this fact by gate 606, which causes a signal to be applied to lead BFT from gate 611. The BFT signal is applied to gating logic 721 to generate a signal on lead BFOUT. This signal, in turn, sets the B control flag in register 801. Since the B flag was not already set for this scan, the complement of the B flag output $\overline{\text{BFIN}}$ from register 801 is high, and since timing count adder 703 has reached a count state of 7 (interdigital timing expired), thereby causing lead LUP to gate 621 to be high, gate 621 generates a signal on lead NUM, which is extended to digit adder 1003 in the digit steering and outpulse gating circuit. The other input to adder 1003 is the digit count output 2DAT(0–3) from shift register 801. The digit count is incremented by one by adder 1003 and the resulting value 1 is inserted into the shift register on leads 2DATI(0–3).

SCC 124 remains in state 4 until the first dial pulse of the next digit is received, which is indicated by reception of threshold F from multiplexer 122. SCC 124 then transfers (path 214) to the "dial pulse restart" state 17. Before SCC 124 does so, however, gate 630 applies a signal through gate 631 to lead CLCNT to clear timing count adder 703. This results in low signals on its output leads CNT(1–3) to clear the timing counter in shift register 801.

SCC 124 consumes one scan cycle, or 5 milliseconds, in state 17 and then enters the "dial pulse start" state 5. While in state 17, however, the count signal CNT from ROM 701 is present to initiate dial pulse timing and this causes gate 627 to apply a signal to lead AD2 which increments timing count adder 703 by 2 instead of 1. This accounts for the 5 milliseconds consumed in state 17 in the timing of the dial pulse threshold F.

The collection of the remaining dialed digits proceeds as described above for the first digit 2, except that decoder 1004 uses the digit count on leads 2DAT(0–3) to generate appropriate signals on the leads B through G to increment the appropriate digit count in register 801. It is possible, however, for digit absorption to occur after the receipt of the second, third or fourth digit, depending upon the value of the digits received.

Digit Absorption

In this example, it is assumed that dialed digit absorption does not occur in exchange 100. If the selectors 111 were designed to absorb, or effectively ignore, certain dialed digits, however, SCC 124 would be correspondingly arranged to absorb the same digits. For this purpose, during each scan of a SPA, the dialed digits which have been received up to that time are placed in the dialed digit register 900 from shift register 801. Register 900 contains a digit absorb detector 901 to perform the absorb function. Arrangements are made for the absorption of 2, 3 or 4 predetermined initial digits. Signals appear on leads P1, P2 and P3 to detector 901 from the 1/N decoder 1004 describing the number of digits that have been stored in shift register 801. A signal on P1 indicates that the A and B digits have been received and signals on P2 and P3 indicate, respectively, that digits A, B and C and A,B,C and D have been received. The digit absorb detector 901 comprises A, B, C and D digit registers 902 to 905 whose inputs are from the corresponding digit outputs of shift register 801. Each of these digit registers, such as 902, has 10 outputs, such as 908, on one of which appears a signal corresponding to the value of the digit stored in the shift register. These outputs from each digit register in 901 and the signals on leads P1, P2 and P3 are strapped in a predetermined manner, determined by the digit combinations to be absorbed, to inputs 909 of a decoder 906. Decoder 906 recognizes when the prescribed digits to be absorbed have been received and, in response, generates a signal on its output lead $\overline{\text{ABSDIGIT}}$, which extends to gate 1001 in the digit steering and outpulse gating circuit 1000. Gate 1001 and inverter 1002 respond to the signal with a signal on lead CFSET2 extending to gating logic circuit 722 in the flag gating circuit. Circuit 722 responds with a signal on its output lead CFOUT to set the C control flag in shift register 801 to indicate that digit absorption has occurred. On succeeding scan cycles of SCC 124, the C flag appearing on the output CFIN of register 801 is applied to a second input of gate 1001 in order to maintain the C flag set. On the current scan cycle, the signal from gate 1001 appearing on lead $\overline{\text{CLRDIGIT}}$ enables gate 1021 whose output on lead ALZ23 clears the A through D digit storage slots in shift register 801 to complete the digit absorption.

Returning to the example under discussion, the remaining four digits 5678 of the called station are received by SCC 124 in the manner as described above and are stored in the D through G digit storage slots in shift register 801. SCC 124 will have completed digit timing and be in state 4 for SPA 0 after the last digit G is received and will remain in this state until a new threshold appears. In the meantime, exchange 100 will have cut-through, by means of its local switch train 112, to the called station and ringing will have been applied to the connection.

Called Subscriber Answer

When the called subscriber at number 234-5678 responds by lifting the station handset, a closed loop signal appears on the connection back to exchange 100 and causes multiplexer 122 to generate the answer threshold G. In order to ensure that the threshold is genuine, SCC 124 times for a guard interval of approximately 805 milliseconds, during which time the threshold G is monitored for persistence. The first approximate 105 milliseconds of this guard interval is provided by states 4, 36, 34, 27, 32, 22 and 20 in FIGS. 2 and 3. Each of these states is designed to consume three scan cycles while threshold G is present before transferring to the succeeding state. This is shown by the loop notation LP-G at the upper left of each of the mentioned state boxes in FIGS. 2 and 3. This looping mechanism is implemented as follows. The stored state information of ROM 701 contains a signal which is present when looping may be desired and this signal is combined with the threshold received on leads TH(1-4) by the ROM to generate a LOOP output signal to a loop count decoder 705. Decoder 705 also receives outputs SET1IN and SET2IN from a loop counter which is maintained in shift register 801. Initially the counter equals 0 and the resulting signals on leads SET1IN and SET2IN cause decoder 705 to generate a signal on its output lead 711, which, in turn, causes ROM 701 to produce state output signals on leads NS(0-4) which are equal to the current state on leads S(0-4). In addition, loop count decoder 705 increments by 1 the loop count received on leads SET1IN and SET2IN and the resulting count is inserted into the loop counter of shift register 801 on leads SET1OUT and SET2OUT. This looping of the current state persists for three scan cycles of SCC 124 if the threshold G persists; after 3 scan cycles, identified by high signals appearing on both inputs SET1IN and SET2IN, loop count decoder 705 removes the signal on lead 711. ROM 701 responds by producing on its output leads NS(0-4) signals corresponding to the next state shown in FIGS. 2 and 3.

In accordance with the above, SCC 124 transfers (path 216) from state 4 to the "answer timing state" 36 3 scan cycles after the answer threshold G is received. Assuming that the threshold G persists, state 36 and each of the succeeding states 34, 27, 32, 22 and 20 similarly consume 3 scan cycles for a total timing delay of 105 milliseconds. When SCC 124 reaches the "answer timing" state 20, the timing count adder 703 is cleared to clear the timing counter in register 801. Also, the B and C control flags in register 801 are cleared to prepare for subsequent operations. Adder 703 is cleared by a signal on lead CLCNT as a result of a state 20 signal on the lower input of gate 631. The B control flag is cleared as a result of the lower input of gate 610 which is low to disable the gate when SCC 124 is in state 20. This removes the signal on lead BFT from gate 611 which maintains the B control flag set. As a result, lead BFT goes low causing the output BFOUT of gating logic circuit 721 to go low which, in turn, clears the B flag in register 801. Gate 617 is activated by its lower input when SCC 124 is in state 20 to generate a signal on lead $\overline{\text{CFCLR1}}$. This causes gating logic circuit 722 to generate a low output signal on lead CFOUT to clear the C control flag in register 801.

After the 3 scan cycles are consumed in state 20, SCC 124 transfers to "answer state" 6. The remaining 700 milliseconds of the answer guard interval is timed in this state by means of timing count adder 703. A CNT output signal from ROM 701 partially enables gate 622, and a state 6 signal on the lower input of gate 622 completes the enabling. The upper input 100MSSTB of gate 622 is from timing circuit 1010 and contains clock pulses which appear every 100 milliseconds and are applied to lead AD1 by gate 622. These 100-milliseconds signals on lead AD1 control adder 703 in a manner already described to increment the timing count state in shift register 801. The counting continues, so long as threshold G persists, until the count reaches 7 at which time, as priorly described, the output $\overline{\text{LUP}}$ from adder 703 goes low and further counting is inhibited. At this time, timing of the answer guard interval is completed and it is concluded that the calling subscriber has in fact answered. The A control flag is set under control of gate 602 to indicate this. SCC 124 then proceeds to load an answer output message into the output buffer 1100 for transmission to AMARC 103.

Answer Message Generation

A request to generate and load an answer message for transmission to AMARC 103 is initially controlled by gate 632. The input ST6 to gate 632 is high when SCC 124 is in state 6. The input AFIN is high because the A control flag was set on the immediately preceding scan cycle; the input $\overline{\text{BFIN}}$ is high because the B control flag was previously cleared in state 20. Therefore, the complement $\overline{\text{LUP}}$ of the signal appearing on lead $\overline{\text{LUP}}$ from timing count adder 703 when the answer timing is completed enables gate 632 and generates a signal on output lead LDLNG which is extended to the ANI interface circuit 1200. Circuit 1200 is a single facility circuit used for all SPAs to access the ANI equipment 116 in exchange 100 to obtain calling station identification information. Thus, it is possible that circuit 1200 will be busy with another request at the time the LDLNG signal is received for SPA 0. In this event, circuit 1200 simply does not respond to the LDLNG signal. Assuming that circuit 1200 is not busy, the ANI interface control logic 1201 responds with a signal on output lead LDLNGACK to gate 607, which causes the B control flag to be set. In addition, circuit 1201 generates a signal on lead AREQ, which activates the line identification control circuit (LICC) 130, and a signal on lead ANS. The signal LDLNGACK also enables the SPA register 1022 in the auxiliary circuit 1020. In response, signals identifying SPA 0 are gated into register 1022 from leads LA(0-8) from timing circuit 1010. The SPA 0 signals now stored in register 1022 are transmitted on leads RA(0-8) to the identification relay selector (IRS) 127. IRS 127 responds by operating a relay to apply a tone signal to the sleeve lead S of line finder 0 which is associated with this call. That signal is extended by means of the sleeve lead to one of the inputs 120 of ANI equipment 116 in FIG. 1. ANI equipment 116, which has been activated by LICC 130, locates the tone signal, identifies a PBX subscriber number associated with PBX trunk line 148 on which the call is received and passes this information to LICC 130.

LICC 130 transmits the identification number to ANI interface circuit 1200 by generating control signals LD(1-6) to control the loading of the exchange code digit 4 for exchange 100, the thousands digit through the units digit of the identified number, and a status word into, respectively, registers 1210, 1203 to 1206 and 1202. The status word describes any errors that ANI 116 may have encountered and further describes other characteristics of the calling subscriber identification. For example, for appropriate subscribers, a message rate or flat rate billing class mark would be included. The ANI 116 status information in status register 1202 is transmitted on output leads ANISTAT(0-3) to the ANI status decoder 1305 in status control 1300. Decoder 1305 translates the status information into a new format for subsequent loading into output buffer 1100.

The LDLNGACK signal generated earlier by ANI interface logic 1201 also activated SCC status decoder 1306 in status control 1300 to store certain status information pertaining to SCC 124 for subsequent loading into output buffer 1100. This status information indicates, for example, whether the calling subscriber improperly dialed more than 7 digits. At this point, all the information is available for loading the answer message into output buffer 1100.

Since during the foregoing identification operations, SCC 124 has been processing other SPAs, it is necessary to wait for SCC 124 to address again SPA 0 before the message contents may be placed in the output buffer. When SPA 0 is again addressed, comparator 1023 in auxiliary circuit 1020 recognizes, by comparing the SPA 0 address on incoming leads LA(0–8) with the SPA address present on the output leads of SPA register 1022, that ANI interface 1200 contains answer information for this SPA. In response, comparator 1023 generates a signal on lead ANSEN which, with the signal on lead ANS from ANI interface control circuit 1201, activates gate 1307 to produce a signal on output lead LNGWD. This signal activates the input control logic 1102 of the output buffer to expect the reception of 8 words of information associated with the answer message. In response, input control logic 1102 generates a signal on its output LNG, which activates the output message gating logic 815 in the cyclic redundant code (CRC) generator 810 to generate a series of loading control signals $\overline{C0L}$ to $\overline{C7L}$. The signals are generated using word count signals on leads W(0–2) from output buffer 1100 which define the number of words which have been loaded into the output buffer during this loading operation. Initially, those signals define the count 0 which, at the proper time, causes gating logic circuit 815 to generate signal $\overline{C0L}$. $\overline{C0L}$ enables the output of ANI status decoder 1305, which causes the ANI 116 status information to be transmitted on bus leads D(4–8). $\overline{C0L}$ also enables the SCC status decoder 1306 to transmit the SCC 124 status information, including a constant to identify this message as an answer message, on bus leads D(0–3). Buffer storage 1101 receives the status words on the bus D(0–8) and stores the word in its next available storage slot under the control of input control logic 1102. The signals on leads W(0–2) from circuit 1102 to output gating logic 815 are updated by control logic 1102 to define the count state 1, and gating logic 815 responds by generating control signal $\overline{C1L}$. That control signal enables SPA register 1207 to apply the SPA address 0 stored therein to the bus leads D(0–8), which is then received by buffer storage 1101 and placed in the next available slot. This operation proceeds until all the information associated with the answer message is loaded into output buffer 1100. Specifically, control signal $\overline{C2L}$ gates the exchange identification code digit 4 from register 1210 and the thousands digit of the PBX trunk line 148 identification number from register 1203 to the output buffer. Similarly, control signal $\overline{C3L}$ controls the gating of the hundreds and tens digits from registers 1204 and 1205 and $\overline{C4L}$ controls the gating of the units digit from register 1206 and the A digit of the called station number from register 1304. $\overline{C5L}$ controls the gating of the B and C digits of the called station number from registers 907 and 910. $\overline{C6L}$ controls the gating of the D and E digits from registers 911 and 912, and $\overline{C7L}$ controls the gating of the F and G digits from registers 913 and 914. When all 8 words have been loaded into buffer storage 1101, input control logic 1102 generates a signal on lead $\overline{LDLNCMP}$ to signify that loading of the answer message is complete. That signal causes gate 1310 to generate signal $\overline{LNGMSGCMP}$, which resets the SPA register 1022 in the auxiliary circuit to release the relay in IRS 127, thereby to remove tone from the sleeve lead associated with the calling station. The $\overline{LNGMSGCMP}$ signal also releases ANI interface circuit 1200 so that it may serve an ANI request for some other SPA.

Communications Between AMARC 103 and CDA 121

All information destined for transmission to AMARC 103 is held by output buffer 1100 until a transmission is requested by AMARC 103. AMARC 103 polls CDA 121 over data channel 104-0 approximately every ½ second with a TRANSMIT or RETRANSMIT command. A TRANSMIT command requests a transmission of all information then stored in output buffer 1100. The RETRANSMIT command is used only to request a retransmission of the last information transmitted when the last transmission was erroneously received by AMARC 103. For this purpose, output buffer 1100 includes a second buffer storage (not shown) which stores the last block of information from buffer storage 1101 transmitted to AMARC 103. In addition, provision is made for an INITIALIZATION command which causes CDA 121 to restart operations with all circuits in an initial state. The INITIALIZATION and RETRANSMIT functions are straightforward and of no particular concern for this discussion. Accordingly, they are not discussed further.

Assume that data channel control 125 and data set 128 are in a receive mode, that is, set to receive a command from AMARC 103. Assuming that AMARC 103 sends a TRANSMIT command to CDA 121, it is communicated serially by means of data channel control 125 to transmitter/receiver 1120 on lead RECDTA and accumulated in byte register 1122. A complete command consists of an initial START byte, followed by a TRANSMIT byte, the complement of the TRANSMIT byte and an END byte. Transmitter/receiver 1120 verifies from this information that a valid command has been received. Command decoder 1123 then decodes the specific command and, in this case, generates a signal on its output lead $\overline{ENBTRN}$ to control logic 1121 signifying the reception of the TRANSMIT command. Control logic 1121 responds by generating a signal on lead 1127 to inhibit further inputs to register 1122 from lead RECDTA and by generating a signal on one of its other outputs 1128 to transfer data channel control 125 and data set 128 from the receive to a transmit mode. Data channel control 125 generates a signal on lead SNDDTA to control logic 1121 to signify that it is in the transmit mode. Assuming that input $\overline{LOAD}$ to control logic 1121 is high, indicating that bus D(0–8) is idle, control logic 1121 responds with a signal on its output leads TR and TRREADY. These signals enable the output control logic 1103 of the output buffer, which, in turn, generates a signal on its output 1106 to cause buffer storage 1101 to output the first word stored therein onto bus D(0–8). Control logic 1121 enables byte register 1122 by means of its output 1126 to receive the word then present on the bus. Control logic 1121 then removes the signal from output lead TRREADY to prevent a further transmission from output buffer 1100 until the word just received is transmitted to AMARC 103. The word is transmitted serially under control of logic 1121 from byte register 1122 via lead TRDTA to data channel control 125 and thence to AMARC 103 by means of data set 128. At the completion of this transmission, control logic 1121 regenerates a signal on lead TRREADY to cause the outputting of the next word from buffer storage 1101. This process continues until buffer storage 1101 has been emptied. The final word transmitted from buffer storage 1101 consists of "0"s and represents a first "end of block" (EOB) character.

During the above transmission operation the lead OEN from output control logic 1103 to CRC generator 810 is high. This signal causes control logic 811 to load each output buffer word placed on the bus D(0–8) into shift register 812. While the word is being transmitted to AMARC 103, shift register 812 shifts the word bit by bit into CRC register 813 where a cyclic polynomial code is accumulated, so that, when all the words have been transmitted, CRC register 813 contains a polynomial computed over the entire block of data that has been transmitted. An end-of-block detector 814 detects the transmission of the first EOB character to transmitter/receiver 1120 and generates in response a signal on lead EB to the output control logic 1103 in the output buffer. This signal prevents any further transmissions from output buffer 1100. A signal on lead EM is generated by output control logic 1103 to acknowledge to CRC generator 810 the transmission of the first EOB character. When the control logic 1121 of the transmitter/receiver is again ready to accept a word for transmission, it generates a signal on TRREAOY which, together with the signal on lead EM, causes CRC control logic 811 to transmit a second EOB character from CRC register 813 to byte register 1122 in the transmitter/receiver. Following this, the cyclic code polynomial is transmitted in 2 bytes from register 813 to transmitter/receiver 1120 and sent to AMARC 103. This represents the completion of the total block of information to be transmitted to AMARC 103, and CRC logic circuit 811 so signifies by generating a signal on its output lead TRCMP to transmitter/receiver 1120 and data channel control 125 to cause the transmitter/receiver and data channel control to be placed once again in a receive mode for receiving the next command from AMARC 103.

AMARC 103 Operations

As mentioned, AMARC 103 communicates with a number of local exchanges. In particular, it responds to answer and disconnect messages from the exchanges relating to local calls to initiate call timing operations and to record magnetic tape entries to be used subsequently for billing subscribers served by the exchanges. We are not here concerned with the general call billing operations of AMARC 103, but with its operations specifically directed to hotel and motel calls served by step-by-step exchanges. The following discussion is directed primarily toward calls of this type.

With regard to exchange 100, AMARC 103 alternates communication with CDA 121 and RMRP 134 at periodic intervals. The times of communication are designed to occur approximately at ½ second intervals. The exact intervals vary, however, and depend upon whether or not the CDA and RMRP at a given exchange communicate with AMARC 103 by means of a separate or a single shared data channel.

Commands from AMARC 103 to CDA 121 include, as mentioned, INITIALIZATION, TRANSMIT, and RETRANSMIT commands, and, as has been seen, receipt of these commands causes CDA 121 to respond to AMARC 103 with answer, disconnect, and other messages then accumulated in its buffer.

AMARC 103 commands to RMRP 134 also include INITIALIZATION, TRANSMIT, and RETRANSMIT commands. These commands although referred to by the same names as commands to CDA 121, are encoded differently therefrom so that messages for CDA 121 are distinguishable from messages for RMRP 134 and vice-versa. This allows both CDA 121 and RMRP 134 to differentiate between and ignore messages from AMARC 103 which are directed to the other unit. The TRANSMIT and RETRANSMIT commands may, in addition, include from 0 to 5 messages, each specifying message register pulsing information applicable to the message register specified in the individual message. Each of the commands to RMRP 134, whether INITIALIZATION, TRANSMIT or RETRANSMIT and regardless of whether or not any individual messages are included, serves as a polling request to the RMRP for it to transmit to AMARC 103 any information then present in its output buffer. Such information might include, for example, failure indications pertaining to certain message registers that are not responsive to pulsing, or it may pertain to failure indications of subcircuits of the RMRP itself. AMARC 103 is programmed to respond to such failure indications in an appropriate manner. For example, in response to a message register failure indication, AMARC 103 would make appropriate teletypewriter printouts to alert personnel of the failure and would thereafter cease any pulsing messages directed to that message register until the failure is corrected. In response to an RMRP failure indication, AMARC 103 would cease transmission of commands to that RMRP until the failure is corrected, as indicated by a new status indication from the RMRP or upon command from personnel at the AMARC 103 site.

In the event of separate dedicated channels between AMARC 103 and CDA 121 and between AMARC 103 and RMRP 134, the respective directions of communications between the units are automatically reversed with each communication. For example, when AMARC 103 sends a TRANSMIT command to CDA 121, data set 108 at AMARC 103 is in a TRANSMIT mode, and data set 128 at CDA 121 is in a RECEIVE mode. As was seen in the discussion of CDA 121 above, immediately after receipt of the TRANSMIT command, CDA 121 places data channel control 125 and data set 128 into a TRANSMIT mode to send the contents of its output buffer to AMARC 103. At the same time, AMARC 103 places its data set 108 into the RECEIVE mode in order to receive that message block. A dedicated channel between AMARC 103 and RMRP 134, if such were the case, would be controlled in a similar fashion by AMARC processor 105 and the RMRP microprocessor 135.

In the case of a shared channel between AMARC 103, CDA 121 and RMRP 134, which is the illustrative case in FIG. 1, communications between AMARC 103 and CDA 121, and between AMARC 103 and RMRP 134, must be interleaved. This is done in the following manner. Assuming that CDA 121 has just completed the transmission of a message block to AMARC 103, it is unnecessary to poll CDA 121 again until approximately ½ second later. Thus, the channel is free at this time for sending commands to RMRP 134. Data channel control 125 and data set 128 are automatically placed in a RECEIVE mode at the end of the transmission from CDA 121 to AMARC 103. Data set 126 for RMPR 134 is already in a RECEIVE mode. AMARC 103 now sends a TRANSMIT command, for example, to RMRP 134. Data link control 125 receives the command via data set 128 and interprets it as destined for RMRP 134 and ignores it. The RMRP microprocessor 135, to which the command is directed, receives it via data set 126. Data set 126 is then automatically switched by microprocessor 135 to allow transmission from RMRP 134 to AMARC 103.

RMRP 134 accepts the command from AMARC 103 and then transmits to AMARC 103 a message block containing information then stored in its output buffer. In most cases, RMRP 134 has nothing to transmit to AMARC 103 and, in this case, a "no data" message block response is sent to AMARC 103 and serves only as an acknowledgment of receipt of the AMARC 103 command. Upon receipt of the RMRP 134 message block by AMARC 103, data channel 104-0 (channel 0) is automatically placed in the TRANSMIT mode so that a next command may be sent to CDA 121. This interleaving of the channel between RMRP 134 and CDA 121 continues at repetitive intervals as described above.

Figure 15:
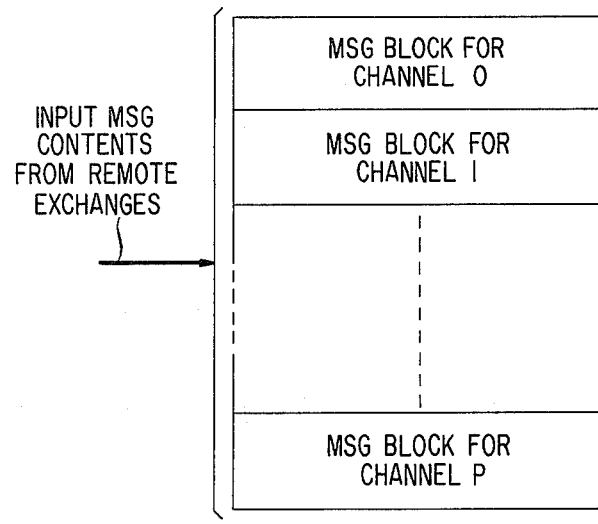
FIGS. 15 through 18 illustrate the memory organization of the remote accounting center which is used to generate hotel/motel guest message register pulsing information.

The message blocks received from the call data accumulators of local exchanges, such as 100, are accumulated by the AMARC 103 main program into an input message assembly table (IAT), which is illustrated in FIG. 15. The table is divided into a plurality of blocks each associated with a separate incoming channel number 0 to P. Since exchange 100 communicates with AMARC 103 by means of channel 0, it is in block 0 of the IAT table that messages from exchange 100 are stored. The main program examines the end-of-block characters appended to a message block received from an exchange and, in addition, it calculates a cyclic redundancy code over the data content of the block and compares it to the cyclic redundancy code transmitted as part of the block by an exchange. Assuming that the end-of-block characters and cyclic redundancy code are proper, indicating that there were no errors in transmission, the main program calls the hotel/motel data processing subprogram which determines if the message block is from a step-by-step exchange that serves hotel/motel trunk lines and, if so, the subroutine processes each individual message of the block as described hereinafter.

Step-by-Step Hotel/Motel Data Processing Subprogram

This subprogram operates on the messages received from a step-by-step exchange to generate message register pulsing information for calls from hotels and motels, which is then transmitted to the appropriate RMRP for the distribution of message register pulses to individual hotel/motel message registers in accordance with the pulsing information from AMARC 103. In addition, the subprogram performs timing operations so that the expiration of initial and overtime billing periods may be determined. When overtime billing periods are initiated, the subprogram communicates additional pulsing information to the appropriate RMRP which distributes the designated number of pulses to the appropriate hotel/motel message registers.

Figure 16:
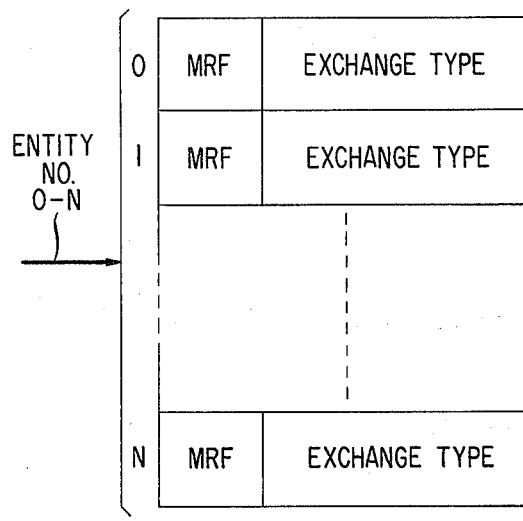
Figure 17:
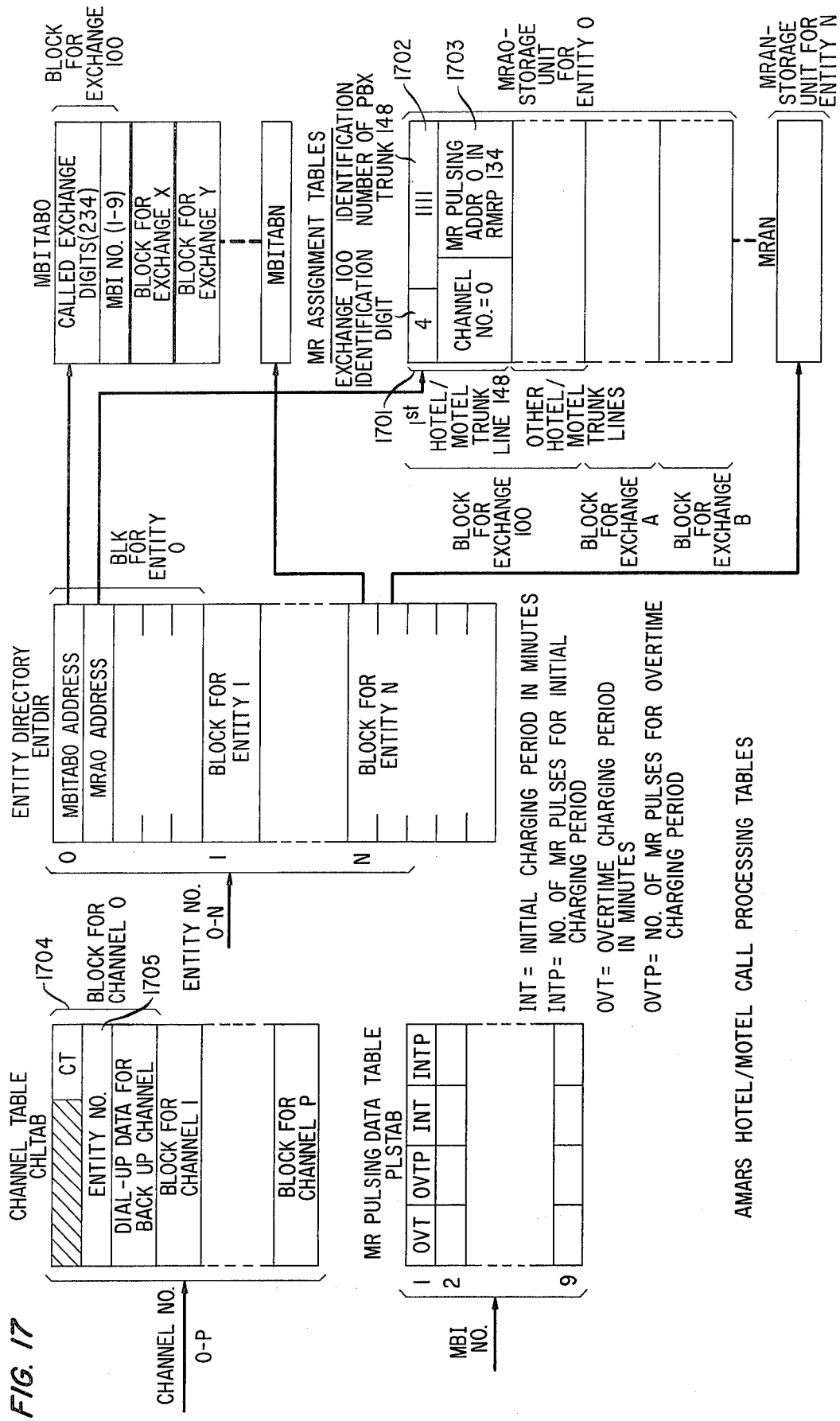

First, the subprogram refers to a channel table CHLTAB, shown in FIG. 17. CHLTAB has a block of information stored for each office that AMARC 103 serves. For example, block 1704 of CHLTAB contains information pertaining to exchange 100 in this illustrative disclosure. The appropriate CHLTAB block to be addressed for any message block arriving at AMARC 103 is determined from the channel number of the data channel on which the message block arrived. The main program obtains an entity number of value O to N from the second word, such as 1705, of an addressed CHLTAB block. The entity number is an arbitrarily defined integer which is used to classify all of the originating exchanges served by AMARC 103 which have identical charging and metering rates for all toll calls terminated within the local exchange area of the exchanges. As one example, this situation occurs when 2 different originating exchanges are located within the same building. The entity number is used to address an entity table ENTTAB, also shown in FIG. 16, from which is obtained parameters describing the type of exchange from which the block was received and describing whether or not the exchange serves hotels and motels. This last parameter is derived from the message register flag (MRF) in ENTTAB. Assuming that the exchange in question is a step-by-step exchange, the EXCHANGE TYPE so indicates, and if MRF is also set, the subprogram proceeds to process the individual messages in the message block just received from the step-by-step exchange. Assuming, on the other hand, that the exchange in question is not a step-by-step exchange, the subprogram simply exits to the AMARC 103 main program since it has no work to accomplish for this message block. The main program, of course, then processes the message in normal fashion so as to finally complete AMA tape entries for billing the subscribers associated with the messages.

Figure 18:
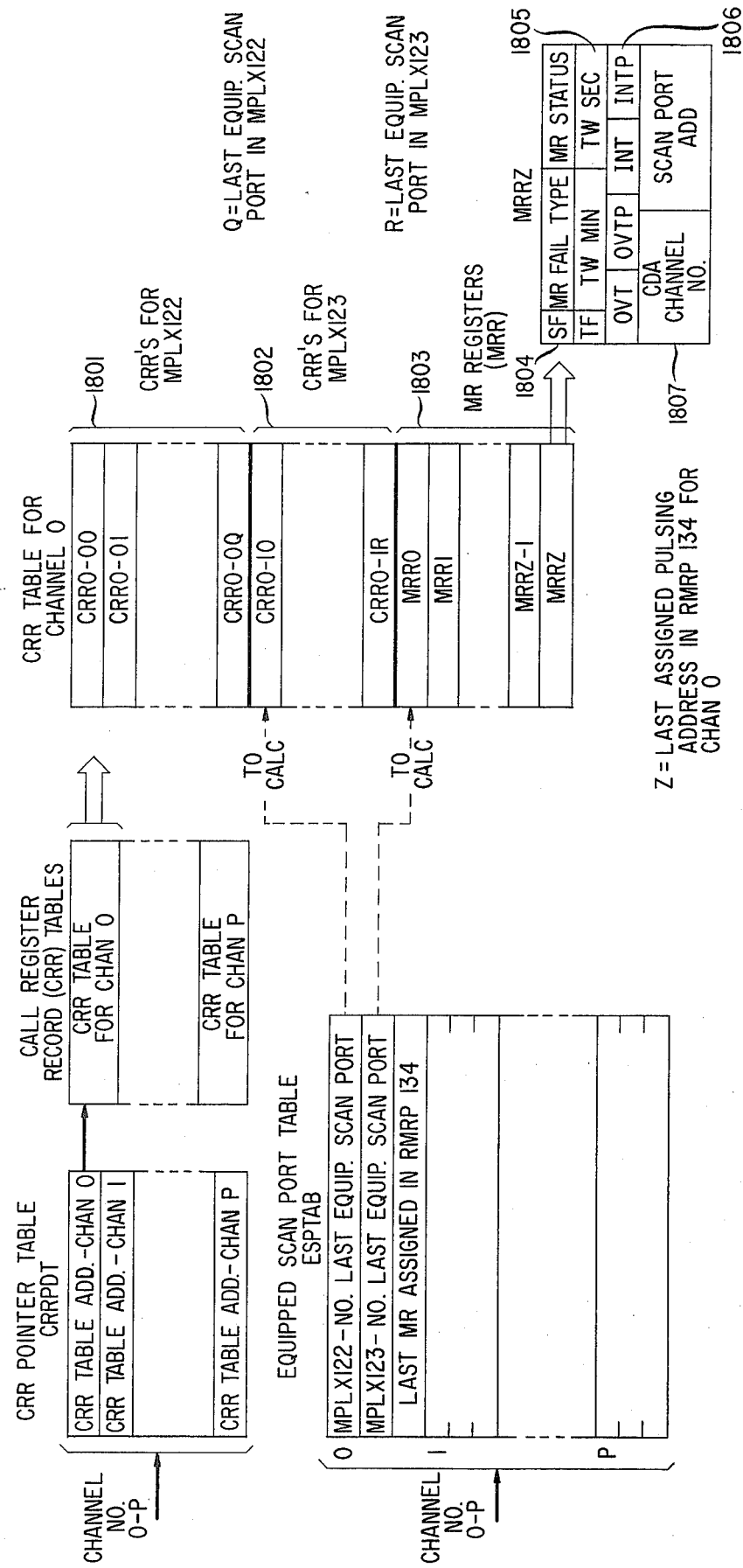

Subprogram flow charts are not included in the drawing, since the subprogram is straightforward once the memory table organization for the subprogram is understood. Table structure associated with the hotel/motel subprogram is shown in FIGS. 16 through 18. The tables of FIGS. 16, 17 and most of FIG. 18 contain nongeneric information, that is, information which describes certain parameters of the particular exchanges which are served by AMARC 103. Each block of the channel table CHLTAB, for example, which was mentioned above, contains a channel type byte CT, and information for dialing-up a backup channel in the event the primary channel fails for any reason. CT contains 2 bits of information encoded to describe whether or not the associated channel is dedicated to communication with a call data accumulator, such as CDA 121, a remote message register pulser, such as RMRP 134, or is shared by both. Illustratively, the following encoding scheme is selected.

| CT | Channel is assigned to |
|----|------------------------|
| 00 | a CDA |
| 11 | a RMRP |
| 01 | both |
| 10 | unassigned |

The entity directory table ENTDIR shown in FIG. 17 contains a plurality of storage blocks, one for each entity number O-N. The pertinent information contained in each block for this discussion are addresses which direct the subprogram to other tables associated with the entity number. One such address directs the subprogram to one of a plurality of message billing information tables MBITAB0 to MBITABN; another address directs the subprogram to one of a plurality of message register assignment tables MRA0 to MRAN. Looking at table MBITAB0 for entity number 0, it is seen that it consists of a plurality of blocks, such as 1706, each associated with a separate called exchange in the local dialing area of exchanges in entity 0 and each containing in a first word, e.g., 1707, the exchange digits of a called exchange and, in a second word, e.g., 1710, a message billing number (MBI) of value 1 to 9. MBITAB0 illustratively includes blocks for exchange 100 and for exchanges X and Y (not shown in the drawing). Once the appropriate one of the tables MBITAB0 to MBITABN is located by the subprogram in response to an answer message on a hotel/motel call, the subprogram searches each block thereof to find a match between the called exchange digits stored therein and called exchange digits received from CDA 121 for a call being processed. The subprogram then obtains the MBI from the located block. The MBI number is used to address the pulsing data table PLSTAB, also in FIG. 17, to get initial and overtime period charging information pertaining to the call.

Each message register assignment table, such as MRA0, is divided into blocks, one for each originating exchange which has the same entity number. For example, for entity number 0, MRA0 illustratively contains blocks for exchanges 100, and for exchanges A and B, not shown, which, it is assumed, also serve hotel/motel subscribers and have identical rate structures for toll calls in each of the exchanges local call area. Each block in each table MRA0 to MRAN further contains separate 2-word informational entries for each hotel/motel trunk line served by an exchange classified with the entity number for the table in question. For example, the first such entry 1701 for the exchange 100 block in table MRA0 illustratively contains information for PBX trunk line 148 in FIG. 1. The first work 1702 of the entry 1701 contains trunk line 148 identification digits 1111 and the identification digit 4 of exchange 100. The second word 1703 of the entry contains an illustrative message register pulsing address 0 in exchange 100 for trunk line 148, and the data channel number 0 which is used to access RMRP 134 at exchange 100. This information for a particular call is found by comparing the PBX trunk line identification information and the exchange identification digit received in the answer messages from a CDA such as CDA 121 with the first word, such as 1702, of each PBX trunk line entry in the appropriate message register assignment table and block thereof. For example, for the call in the example under discussion on PBX trunk line 148, the subprogram will find a match between the identification information received in the answer message from CDA 121 and the first word of the entry in MRA0. The channel number to RMRP 134 and the pulsing address therein are then retrieved from the second word 1703 of the entry.

With reference to FIG. 18, the AMARC 103 main program uses call register record (CRR) tables to store variable information pertaining to call timing and the like. The hotel/motel subprogram uses message register record (MRR) tables which are storage areas associated with step-by-step hotel/motel stations for storing variable data pertaining to hotel/motel calls. For each data channel incoming to AMARC 103 from a SxS exchange, the CRRs and MRRs are arranged in a contiguous block of storage which is divided into three segments, as shown in the exploded view in FIG. 18 of the CRR table for data channel 0. The upper segment 1801 contains CRRs for the line finders in exchange 100 which are monitored by multiplexer 122. It is recalled that multiplexer 122 has 256 monitoring scan port addresses (SPAs) numbered 0 to 255 and that these SPAs are assigned in sequential order to line finders as needed. It is assumed that Q of these SPAs are assigned, and this is reflected in the exploded view of the CRR table for channel 0 which contains Q+1 CRRs, identified by CRR0-00 to CRR0-0Q, for multiplexer 122. The middle segment 1802 of the channel 0 table contains the CRRs for line finders monitored by multiplexer 123 in exchange 100. It is recalled that multiplexer 123 monitors SPAs numbered 256 to 511, and it is assumed here that R of these SPAs are assigned to line finders in exchange 100. Accordingly, there are R+1 CRRs in the middle segment of the exploded view of the channel 0 CRR table, designated as CRR0-10 to CRR0-1R. The details of the contents of and the administration of the CRRs are not important for this discussion.

The last segment 1803 of the channel 0 CRR table contains the MRRs corresponding to the assigned address points in RMRP 134 for pulsing hotel/motel message registers served by exchange 100. It is assumed that Z+1 pulsing addresses are assigned and these are assigned sequentially in order. There are, therefore, Z+1 MRRs in the last segment identified as MRR0 to MRRZ.

In the lower right of FIG. 18, MRRZ is expanded to show its organization in detail. It consists of four words, the first word 1804 containing a flag SF, which when set initiates the generation of a pulsing message to RMRP 134 at the beginning of an initial or overtime charging period on a call by a hotel/motel guest associated with message register pulsing address Z. The first word also contains a message register status byte and a byte for storing failure indications associated with the pulsing address in RMRP 134. The second word 1805 contains a flag TF which is set whenever an initial or overtime charging period is in the process of being timed. The bytes TWMIN and TWSEC in the second word are used to store minute and second information remaining in the initial or overtime charging period. In the third word 1806, the subprogram stores in respective bytes OVT and OVTP the initial overtime charging period in minutes and the number of message register pulses associated with that period. The word is also used to store in respective bytes INT and INTP the overtime charging period in minutes and the number of message register pulses associated with that period. The fourth and last word 1807 of MRRZ is used to store the channel number 0 from CDA 121 and the scan port address in CDA 121 on which a call associated with pulsing address Z is in progress. All other MRRs in the CRR tables for channels 0 to P are of course arranged in the same manner as that shown for MRRZ. The initial and overtime information that is stored in the third word of an MRR is obtained from the message register pulsing data table PLSTAB shown in FIG. 17 as will be described.

The starting address of a CRR table for a particular data channel is obtained by addressing a CRR pointer table CRRPDT in FIG. 18 by the channel number to get the starting address. For channel 0, for example, this results in obtaining the address for CRR0-00, which is the CRR for scan port address 0 served by multiplexer 122 in CDA 121. The equipped scan port table ESPTAB, also in FIG. 18, is used to derive the starting CRR address for the first scan port address served by the second multiplexers of exchanges, such as multiplexer 123 for example, and the starting address of the MRRs pertaining to the data channel and exchange in question. Table ESPTAB is addressed by the channel number to locate a 3-word block. With reference to the first block for channel 0, the first word MPLX122 of this block contains the number of the last equipped scan port served by the first multiplexer 122, which is Q in exchange 100. The second word MPLX123 of the block contains the number of the last equipped scan port served by the second multiplexer 123, which is the value R. The third word of the block contains the number of the last assigned hotel/motel message register pulsing address in RMRP 134, which is assumed to be the number Z. Each of the other blocks, of course, contains the equivalent information for the exchange associated with the data channel in question. Thus, to derive the address of the CRR for the first scan port address (256) served by multiplexer 123 in exchange 100, the value Q is obtained from the first word of the channel 0 block in ESPTAB, is incremented by 1 to form the number of equipped scan ports in multiplexer 122 and this value is multiplied by the size of each CRR such as CRRO-00. This value is then added to the CRR table address obtained from the CRR pointer table CRRPDT. To derive the starting address of MRRs for exchange 100, the CRR starting address for the first scan port address served by multiplexer 123 is derived as described above and to this is added the value obtained by multiplying the contents R of the second word of the ESPTAB block for exchange 100, incremented by 1, by the size of each CRR.

The operations of the hotel/motel subprogram are now described. It is assumed that a message block has just been received from CDA 121 and that the first message of the block is the answer message pertaining to the call under discussion on PBX trunk line 148.

The hotel/motel subprogram is given the channel number 0 associated with the received message block when it is called by the main program, and an address in the table IAT (FIG. 15) pertaining to the message block being processed by the main program. The subprogram first determines if the message block is from a step-by-step exchange by addressing table CHLTAB with the channel 0 number to get the entity number for exchange 100. The entity table ENTTAB in FIG. 16 is then addressed using the entity number to get the EXCHANGE TYPE. This information indicates that exchange 100 is a step-by-step exchange. Accordingly, the subprogram then examines the MRF flag from the same word of the ENTTAB table and determines therefrom that exchange 100 serves hotel/motel trunk lines. As mentioned, if it had been determined that the message block in question had not been from a step-by-step exchange, or that the step-by-step exchange did not serve hotel/motel trunk lines, then the subprogram would merely return to the AMARC 103 main program since it would have no further functions to perform.

The subprogram next obtains information from the table CHLTAB in FIG. 17 describing the type of data channel used to communicate with exchange 100. For the illustrative organization of CHLTAB here, the channel type CT in the first block is interrogated to determine whether or not channel 0 is dedicated to call data accumulator (CDA) 121, or to RMRP 134, or whether the channel is shared by both. In the illustrative embodiment, channel 0 is shared. This causes the subprogram to interrogate a header word of the message block in IAT in FIG. 15, which contains information identifying the source (CDA 121 or RMRP 134) of the message block. In this case, the source is identified as CDA 121. Had the source been RMRP 134, the subprogram would have used the message contents to update the appropriate memory, such as a message register failure indication in a MRR for example.

The subprogram must now determine whether each message of the message block being processed is an answer message pertaining to a call from a hotel/motel guest. With regard to the first message in the block, the subprogram determines from the message that it is an answer, as opposed to a disconnect, message. In order to determine if the answer message pertains to a hotel/motel guest call, the subprogram next addresses the entity directory table ENTDIR in FIG. 17 with the entity number O obtained from table CHLTAB to locate the address of the appropriate message register assignment table which is here MRA0.

The subprogram searches MRA0 for a match between the calling exchange identification code (4 for exchange 100) plus the calling subscriber identification digits (1111 for PBX trunk line 148) received in the answer message and information stored in the first word of each trunk line entry in MRA0. In this illustrative case, a match is found in the first entry 1701 of MRA0. The subprogram now proceeds to generate message register pulsing information for this call for an initial charging period and to transmit this information to the appropriate RMRP, using the message register pulsing address and channel number 0 obtained from the second word 1703 of the entry in MRA0.

The charge timing and pulsing information is obtained from the message register pulsing data table PLSTAB in FIG. 17 by addressing PLSTAB with the message billing information (MBI) number obtained from the message billing index table MBITAB0 as above described. For the illustrative call, the initial charging period and the number of corresponding message register pulses are assumed to be 3 minutes and 4 pulses, respectively. Each overtime period and the corresponding pulses are assumed to be 5 minutes and 7 pulses, respectively. The starting address of the MRRs for exchange 100 is computed from the information stored in the CRR pointer table CRRPDT (FIG. 18) for channel 0 and in the equipped scan port table ESPTAB, as already described. The subprogram then computes the address of the MRR assigned to the message register pulsing address 0 obtained from the MRA0 table by adding to the MRR starting address the value of the message register pulsing address multiplied by 4 (the size of each MRR). Thus the address of MRR0 is derived and the subprogram inserts the timing and charging information it obtained from the pulsing data table PLSTAB into the third word of MRR0. The subprogram also initializes the TWMIN byte in the second word of MRR0 to the number of minutes for the initial charging period that was just inserted into the INT byte of the third word. It also initializes TWSEC to 60 seconds. TWSEC is used by a timing subroutine, described below, to time each minute of the charging period. The channel number obtained from MRAO is inserted into the fourth word of MRR0, together with the SPA 0 obtained from the answer message from CDA 121. Finally, the subprogram sets the SF flag in the first word of MRR0 to request the transmission of pulsing information to RMRP 134, and it sets the TF flag in the second word to activate timing operations on this MRR. The subprogram then proceeds to process the remaining messages in the message block received from exchange 100 and upon completion it exits to the main program. For each of the disconnect messages found in the message block, the subprogram merely terminates its timing operations for the call that disconnected by clearing the "timing in progress" flag TF in the appropriate MRR associated with the call. The AMARC 103 main program apart from this independently initiates an AMA type entry for the call so that the hotel/motel involved will subsequently be billed for the call.

The information just setup in MRRO requesting that a pulsing message be sent to RMRP 134 remains in MRR0, with no action being taken, until channel 0 is available for sending pulsing information to RMRP 134. The availability of channel 0 for sending pulsing information to RMRP 134 is determined as follows. When AMARC 103 polls CDA 121 in exchange 100, and CDA 121 responds with a "no data" message block, that is, a message block containing no answer or disconnect messages, the shared channel is then determined by the step-by-step hotel/motel suprogram to be available. This criterion is used because, since there are no messages from CDA 121 to be processed, it assures that close to a full ½ second interval is available for use in compiling message register pulsing messages into a block and for transmitting the block to RMRP 134. It is expected that the "no data" situation will occur within 1 or 2 polling periods (½ to 1 sec) of CDA 121, so that no difficulty arises from the delay between setting up MRRO and the actual generation of the associated pulsing message to RMRP 134. Had the channel to RMRP 134 been dedicated to the RMRP, the subprogram would generate the pulsing message to the RMRP after a polling message has been received from RMRP 134, since the channel would then be free to transmit information to the RMRP.

In either event, at the appropriate time, the subprogram calls a RMRP polling subroutine to generate messages to RMRP 134 associated with the available channel 0. The subroutine scans all the associated MRRs for channel 0 to find the first one having the SF flag set to 1. It then generates a pulsing message including the message register pulsing address and the number of pulses, obtained from the MRR, and loads this message into an output buffer for channel 0 for transmission to RMRP 134.

The subroutine then continues to scan the remaining MRRs associated with channel 0 and repeats the above process until either the MRRs have been exhausted or the output buffer is full. It then returns to the hotel/motel subprogram which continues its processing of CDA and RMRP message blocks.

MRR Timing Operations

Once each second, the AMARC 103 main program enters a MRR timing subroutine to administer the initial and overtime charging information stored in each MRR then associated with a call in progress. The timing program first scans the channel table CHLTAB in FIG. 17 and examines the byte CT in the first word of each channel block to determine which channels are used to communicate with a RMRP. For each one of these, the timing program addresses the equipped scan port table ESPTAB (FIG. 18) using the channel number to get information for calculating the memory address of the corresponding MRR. For the first channel from table CHLTAB associated with a RMRP, the subroutine calculates the starting address of the MRR block associated with the exchange, as above described, and it then scans the "timing in progress" flag TF in each assigned MRR for the exchange. For each MRR in which the TF flag is set, the program decrements the contents of TWSEC in the MRR and then tests the result for 0 to see if 1 minute of the initial or overtime period then in progress has expired. If the result is not equal to 0, the program merely continues to scan the remaining MRRs. On the other hand, if 1 minute has expired, the program resets TWSEC to 60 to time the next minute of the interval and, in addition, it decrements the contents of TWMIN by one to account for the minute just expired from the interval. The program then tests the results of the TWMIN decrementation for 0 to determine if the full timing interval has expired. If it has, the program resets TWMIN with the overtime interval information stored in OVTP of the third word of the MRR. It then sets the flag SF in the first word of the MRR so that the hotel/motel subprogram described above will generate a pulsing message containing overtime pulsing data to the RMRP in question at its next opportunity. The scanning of the MRRs associated with the channel in question is continued until completed, at which time the timing program proceeds to scan the MRRs for the next channel in channel table CHLTAB which is associated with a step-by-step exchange serving a RMRP.

Remote Message Register Pulser

In FIG. 1, RMRP 134 is seen to consist of a microprocessor 135, which communicates with a distributor 136 and scanner 137, each of which, in turn, communicates with a message register relay circuit 138. Circuit 138 contains a plurality of relays assigned individually to incoming hotel/motel trunk lines to exchange 100, such as trunk line 148. As described earlier, microprocessor 135 receives pulsing messages from AMARC 103 which identify PBX message register pulsing addresses to be pulsed and thus relays in circuit 138 by which the pulsing is accomplished.

The program of microprocessor 135, which controls the operation of relays in circuit 138, consists primarily of a main program which cycles repetitively in executing the messages received from AMARC 103, and a real-time subroutine RLTIME, which is executed approximately every 5 milliseconds to perform input/output operations in conjunction with data link control 125 and to perform timing functions regarding the pulsing of message register relays.

Figure 19:
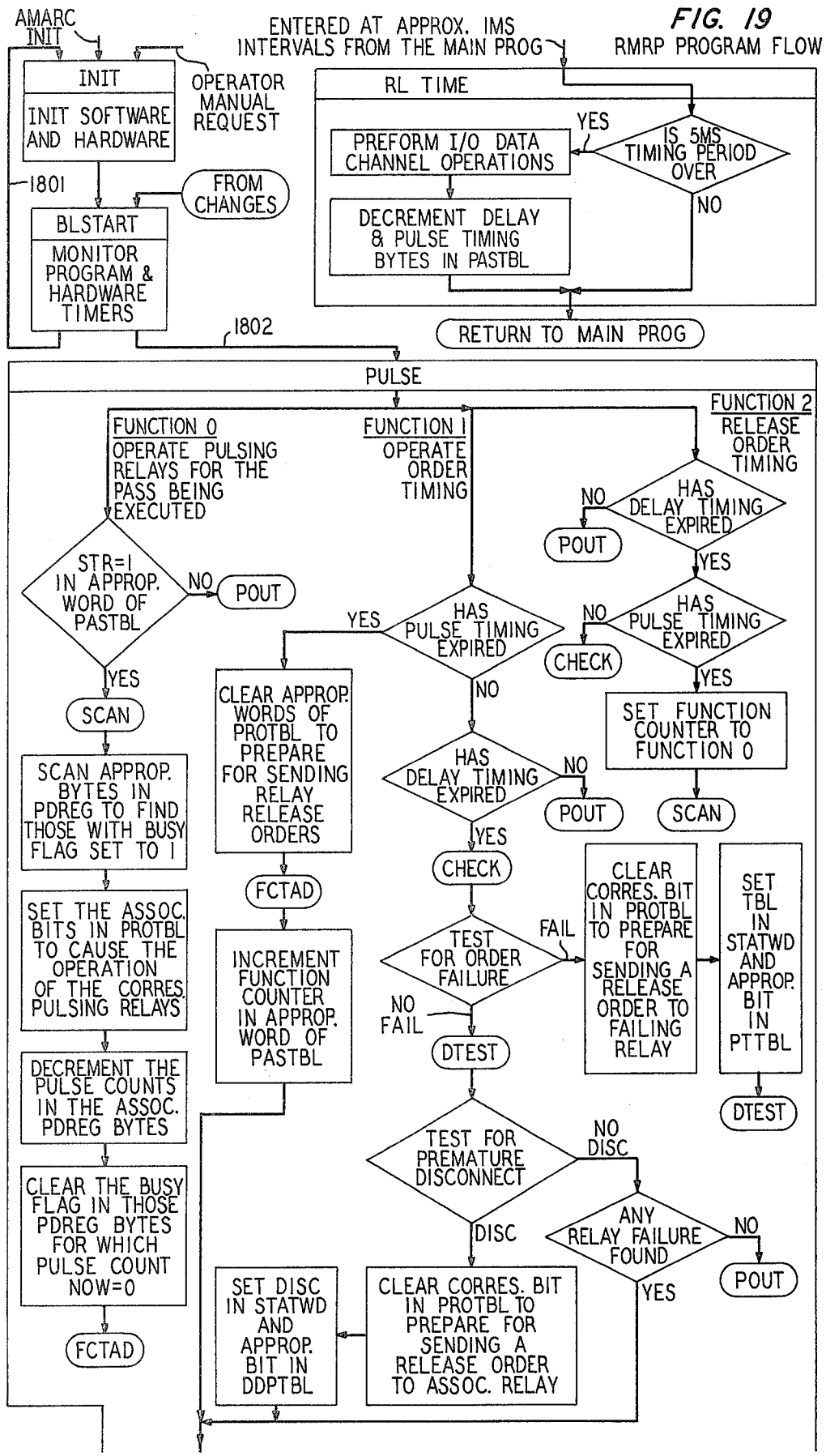

A simplified flow chart of the main program is shown in FIGS. 19 and 20 which are arranged according to FIG. 21. Starting at the upper left of FIG. 19, it is seen that the main program consists of an INIT subroutine which may be entered upon request from an operator at exchange 100 or upon an INIT command from AMARC 103. The INIT subroutine performs initialization functions, such as clearing the variable memory used by the main program, so that its operation may begin at a convenient start point. The main program also consists of the subroutines BLSTART, PULSE and CHANGES in FIGS. 19 and 20. BLSTART is initially entered after an execution of the INIT subroutine and it monitors certain program and hardware timers in order to test for malfunctions in the hardware or main program execution. BLSTART may cause a reentry to INIT, shown by program path 1801, if system malfunctions are detected. In the normal course of events, however, it exits to the PULSE subroutine in FIG. 19 by means of program path 1802.

The PULSE and CHANGES subroutines form the operational part of the main program of concern here.

The PULSE subroutine primarily executes message register relay distribute orders by means of distributor 136 to operate and release the relays in accordance with the pulsing messages from AMARC 103 and in accordance with a timing schedule to be described. In addition, it tests for message register relay failures by interrogating binary state sensing devices which are located in scanner 137 and which monitor the operated or released states of the relays in circuit 138. The PULSE subroutine also monitors the sleeve lead S of each incoming hotel/motel trunk line to test for a calling subscriber on-hook condition occurring while pulsing operations are in progress to the guest message register in question. This is called a "disconnect during pulsing" and, in this event, corrective action must be taken, as will be described in more detail.

The CHANGES subroutine operates primarily to administer message register relay failures and the "disconnects during pulsing", which are detected by the PULSE subroutine.

In order to execute the real-time program RLTIME at periodic intervals, transfers to RLTIME are dispersed throughout the subroutines BLSTART, PULSE, and CHANGES at selected points so that entries are made at approximate 1-millisecond intervals. Each time RLTIME is entered, it checks a 5-millisecond hardware clock to see if 5 milliseconds have expired since the last execution and, if so, it proceeds to administer input/output operations between AMARC 103 and RMRP 134 and to update timing information pertaining the distributes of orders to relay circuit 138. If a 5-millisecond timing period has not expired, RLTIME merely returns to the main program at the point from which it was entered.

The distributor 136 contains a matrix of distribute points which are assigned to individual relays in circuit 138. The first half of these points is located in the 0 half of distributor 136 and the second half is located in the 1 half. This matrix corresponds in format to that of a pulsing relay order table PROTBL, which is shown in FIG. 22. There are 8 rows of distribute points in the matrix, corresponding to words 0 to 7 of PROTBL, with each row containing 16 distribute points. For example, in word 0 of PROTBL, bit 0 corresponds with a pulsing relay and distribute point, both which are assigned the pulsing address 0, and bit 14 of that word corresponds with message register relay and distribute point address 14. In addition to the 15 distribute points in each matrix row, which correspond to bits 0 to 14 of each PROTBL word, there is another distribute point in each row corresponding to bit 15 of each PROTBL word which are respectively designated as DIS0 to DIS7. These address points are used to operate relays in circuit 138 which, in turn, disable the operation of any of the pulsing relays in the associated rows. These distribute points are used primarily for maintenance features and are not discussed in detail herein. The distribute matrix of distributor 136 is addressed by microprocessor on a row basis. That is, each distribute point in a row is controlled simultaneously by microprocessor 135 in accordance with the contents of the associated word of table PROTBL. A "1" in PROTBL causes the operation of the associated relay in circuit 138, and a "0" causes a release of the relay.

It is understood that the above layout of the distribute points and the table PROTBL is entirely discretionary and that any other desired layout could be used just as well.

There are 2 scan points in scanner 137 associated with each distribute point in distributor 136, one for a sleeve lead S and another for a message register lead M of each PBX trunk line. The layout of the scan matrix of scanner 137 is selected so that half of the scan matrix contains the S lead scan points and corresponds in format to PROTBL. The second half of the matrix contains the M-lead scan points and also corresponds in format in PROTBL.

Distribute order execution is performed in 4 passes by the main program. The first pass, identified as pass 0, executes orders associated with distributor rows and PROTBL words 0 and 4. Similarly, pass 1 is concerned with rows 1 and 5, pass 2 with rows 2 and 6, and pass 3 with rows 3 and 7. This arrangement is used to control the time consumed by the main program on each cycle of execution of the BLSTART, PULSE and CHANGES subroutines. A pass counter, which defines the pass currently in progress, is maintained in a status word STATWD, shown in FIG. 22. Each pass is divided into three distinct functions designated as functions 0 to 2, which will be described in detail hereinafter. Briefly, pulsing relays in circuit 138 are operated during function 0. Function 1 performs timing operations after an operation of pulsing relays and executes pulsing relay release order after the expiration of timing; function 2 performs timing operations after a release of pulsing relays.

A pass table PASTBL in FIG. 22 contains a memory word for each of the passes 0 to 3. A byte identified as FUNCT in each PASTBL word contains a count identifying which function 0 through 2 is currently in progress. Each PASTBL word also contains delay timing and pulse timing bytes, which are used to perform the timing operations after operations and releases of pulsing relays. An STR flag is set in the appropriate PASTBL word, as will be described, whenever a pulsing operation is to be performed on the distribute rows associated with the pass in question, and an SCK flag is set to suppress the interrogation of scan points by the main program during certain testing operations which are not pertinent to an understanding of the invention.

A pulsing data register PDREG, in FIG. 22, is used to store variable information pertaining to the number of pulses remaining to be executed to pulsing relays. The table contains 60 words, 0 to 59, each divided into two halves individually associated with a different distribute point. For example, the first half of word 0 in bits 0 to 7 is associated with the 0 distribute address and the second half in bits 8 to 15 is associated with the 1 distribute address. Likewise, word 59 contains 2 bytes associated with distribute addresses 118 and 119. Each 8-bit byte contains pulse count information in its first 7 bits, as shown by the expanded view of byte 0 in FIG. 22. The last bit of each byte contains a BUSY flag, which is set whenever pulse count information is present in that byte; that is, whenever pulsing is actively in progress to the associated distribute point. Pulse count information is initially inserted into PDREG by the RLTIME subroutine during data channel input operations when pulsing messages are received from AMARC 103. The STR flag in the pass table PASTBL is also set at this time for the rows in which pulsing commands are to be executed.

A "disconnect during pulsing" table DDPTBL is shown in FIG. 22, and has the same format as the pulsing relay order table PROTBL. That is, each bit of the words 0 through 7 of DDPTBL is associated with the corresponding bit in PROTBL and is set by the main program to signify that a calling subscriber has disconnected when pulsing to the associated hotel/motel message register is in progress. Since an individual guest message register, such as 132-1 in FIG. 1 at hotel/motel 102-1, is cut through to the M-lead of a trunk line, such as 148, by the hotel/motel PBX network 133, and since the trunk line in question may be immediately reseized after disconnect, and cut through to another guest associated with a different message register, it is clear that pulsing then in progress must be stopped to prevent improperly charging the subsequent guest. As will be seen, the DDPTBL bits are set by the PULSE subroutine during the execution of function 1 in the event of a premature disconnect. These bits are used to stop message register pulsing and to cause the CHANGES subroutine to alert AMARC 103 of the number of pulses that remain to be executed to the message register in question so that a corrective billing entry may be made by AMARC 103. Whenever a premature disconnect condition occurs, a flag DISC is also set in the status word STATWD.

A pulsing trouble table PTTBL in FIG. 22 also has the same format as the pulsing relay order table PROTBL, and the individual bits therein associated with separate pulsing relays are set by the PULSE subroutine whenever a distribute order failure is detected. These indications are also used to stop pulsing to the message register in question, and by the CHANGES subroutine to alert AMARC 103 to the failures and to identify the number of pulses remaining to be executed to the associated message registers. A flag TBL in status word STATWD is set when any such failure is detected.

Returning now to the specific example under discussion, it is assumed that the RMRP 134 main program is operating in a normal fashion and calling the real-time subroutine RLTIME at approximate 1-millisecond intervals, which, in turn, performs input/output data channel operations at approximate 5-millisecond intervals.

The message block transmitted to RMRP 134 by AMARC 103, including the pulsing message to distribute point address 0 for the call in question on trunk line 148, is received one byte at a time with each entry of RLTIME. The subroutine detects the end of the block by recognizing two end-of-block (EOB) characters and two cyclic redundancy code (CRC) characters which are appended to the block similarly as described for message blocks from CDA 121 to AMARC 103. After message block reception is complete, the subroutine RLTIME places the data channel 104-0 (channel 0) in a mode to transmit a response to AMARC 103 and it then uses the CRC characters to check the validity of the data received. If the message block has been received erroneously, the RMRP does not respond. AMARC 103 times out and sends a RETRANSMIT message containing the message block erroneously received once again to RMRP 134. Assuming that the block has been received correctly, however, RLTIME decodes the head character of the block to determine whether it is an INITIALIZATION, TRANSMIT, or RETRANSMIT block. In this case, it is assumed to be a TRANSMIT block. RLTIME then proceeds to decode each individual message in the block and it calls on appropriate subroutines (not shown in the drawing) to administer the messages to initiate operations of the main program. For example, a message might request that a specific number of pulses be sent to a designated pulsing address, or it might request that one of the maintenance distribute points corresponding to DIS0 through DIS7 in the pulsing relay order table PROTBL be operated or released. For our purposes, it is assumed that the pulsing message for address 0 associated with the initial charging period of the call on trunk line 148 is now to be processed.

In response to this message, the input/output subroutine RLTIME calls a START PULSE subroutine (not shown) to initialize the main program tables to begin execution of the message. Specifically, START PULSE uses the distribute point address 0 obtained from the message to read the corresponding byte 0 from the pulsing data register PDREG to determine if pulsing to the address is already in progress. That condition would be indicated by the BUSY flag in bit 7 of the byte being in a 1 state and would indicate an abnormal condition. In this case, the START PULSE subroutine would ignore the message and, in addition, would generate and load an output message into the RMRP 134 output buffer (not shown) for transmission to AMARC 103 to inform it of the abnormal condition. Assuming that pulsing is not in progress to address 0, however, the pulse count data (here 4 pulses for the initial charging period) received in the message is loaded into byte 0 of PDREG, and the BUSY bit is set. In addition, since distributes to pulsing address 0 are executed during pass 0, the subroutine sets the STR flag in the pass 0 word of pass table PASTBL to activate the pulsing by the main program. The START PULSE subroutine then returns to the RLTIME subroutine which completes its operations with regard to remaining messages of the block and returns to the main program at the point at which it was called.

With reference to the flow diagram in FIGS. 19 and 20, nothing happens with regard to the pulsing request just initiated to address 0 until the PULSE subroutine is subsequently entered during pass 0 when it is scheduled to execute function 0. When this occurs, the PULSE subroutine finds the STR flag set in pass word 0 of table PASTBL. The STR flag is cleared and PULSE then scans all the PDREG bytes corresponding to pulsing addresses in rows 0 and 4 of the distributor 136 matrix, which are processed in pass 0. Specifically, this includes bytes 0 to 14 in PDREG words 0 to 7 and bytes 60 to 74 in PDREG words 32 to 39. The foregoing is performed at the program address SCAN in the PULSE subroutine of FIG. 19. The subroutine finds the BUSY bit set at least for pulsing address 0 and, in response, it sets bit 0 in the pulsing relay order table PROTBL to "1" to request an operation of the corresponding pulsing relay. The PULSE subroutine decrements by 1 the pulse count stored in bits 0 to 6 of the PDREG byte 0. The result after decrementing is then tested for 0 to determine if all pulsing will be completed to pulsing address 0 after the following distribute and, if so, the BUSY flag in bit 7 of PDREG byte 0 is cleared. In this example, however, pulsing has not yet begun and the pulse count result stored in PDREG byte 0 after decrementing is therefore 3. The PULSE subroutine therefore continues scanning the aforementioned PDREG bytes until all are completed. The corresponding bits in PROTBL are set to "1" for any other of these PDREG bytes whose BUSY flag is set. The PULSE subroutine now initializes the delay timing and pulse timing bytes in the pass 0 word of table PASTBL to the values 6 and 60, respectively. The contents of the delay and pulse timing bytes for all 4 pass words in table PASTBL are decremented by 1 each approximate 5-millisecond interval by the RLTIME subroutine, so that the numbers 6 and 60 produce timing intervals of 30 and 300 milliseconds, respectively. The 30-millisecond delay timing is used, as will be seen, to provide an appropriate time to test for success or failure of the distribute orders about to be executed. The 300-millisecond interval is selected in view of the response time of message registers and it establishes the time after an operation when pulsing relays may be released.

After the aforementioned PDREG bytes associated with pass 0 have been scanned, and the appropriate PROTBL bits set for the pulsing addresses to which relay operate orders are to be sent, the subroutine PULSE proceeds to execute the orders. As mentioned, this consists of addressing the distributor 136 row 0 with the data from table PROTBL word 0 and again addressing distributor row 4 with the PROTBL data from word 4. As a result, the distributor 136 operates each pulsing relay in circuit 138 to a state in accordance with 1 or 0 states of each of the PROTBL bits in the words. The execution of distribute orders occurs at program address SEND in subroutine PULSE. The FUNCT byte in word 0 of table PASTBL is incremented so that, on the next pass 0 entry of the PULSE subroutine, function 1 will be executed. The pass counter stored in STATWD is then incremented by 1 at program address POUT so that, on the next entry to the PULSE subroutine, pass 1 will be executed. The main program now proceeds from the PULSE subroutine to the CHANGES subroutine, where the TBL and DISC flags in STATWD are interrogated to determine if there are any distribute failures or premature disconnect situations to be administered.

The CHANGES subroutine does not operate on a pass basis like PULSE. Rather, any distribute order failure or premature disconnect that was detected at a prior time but not yet administered may be administered by CHANGES at any time. For this discussion, however, any premature disconnect or failure pertaining to the distribute orders just executed cannot be detected until after the delay time interval of 30 milliseconds has expired. For the time being, therefore, the discussion of CHANGES is deferred. It is assumed that CHANGES finds no work to administer and that it merely exits to the main program which then calls the BLSTART subroutine to begin the next pass 1.

Pass 1 operates to execute distribute orders to the distributor 136 rows 1 and 5 associated with table PROTBL words 1 and 5 in the same manner as described for pass 0. Similarly, passes 2 and 3 execute distribute orders to those distributor rows affiliated with PROTBL words 2, 6 and 3, 7, respectively. Thereafter, pass 0 is once again executed and this time function 1 is performed by the subroutine PULSE. In function 1, subroutine PULSE first tests the pulse and delay timing bytes in the pass 0 word of table PASTBL to determine if it is time to send pulsing relay release orders or to test for failures of operate distribute orders executed during pass 0, function 0. Assuming that the delay timing since the operation of pulsing relays in pass 0, function 0, has not yet exceeded 30 milliseconds, which is indicated by the fact that the delay timing byte is nonzero, the PULSE subroutine merely increments the pass counter in STATWD and exits to the CHANGES subroutine. The main program thus continues so that at a subsequent time the PULSE subroutine again executes function 1 in pass 0 whgn the delay timing byte in PASTBL is 0. At that time, at program address CHECK, the PULSE subroutine tests to determine if the message register pulsing relays in circuit 138 associated with table PROTBL words 0 and 4 are in the state designated by the bits of those words 0 and 4. It does this by interrogating the corresponding scan point rows in scanner 137 which monitor the M-leads of the associated hotel/motel PBX trunk line, and thus the circuit 138 relay states, and by comparing those states with words 0 and 4 in PROTBL. If any relay failure is found, the subroutine clears the corresponding bit in the table PROTBL to prepare for sending a release order to the failing relay. It also sets the appropriate bit in PTTBL to identify the failing relay and it sets the trouble summary flag TBL in STATWD.

Assuming that no failures have occurred, subroutine PULSE then determines if any subscriber for which pulsing is in progress has disconnected. It does this by interrogating the corresponding scan point rows in scanner 137 which monitor the S-leads of the PBX trunk line and by comparing the S-lead states to the states in words 0 and 4 of PROTBL. An indication that a subscriber for which the corresponding PROTBL bit is 1 has disconnected causes subroutine CHECK to clear the corresponding bit in PROTBL to prepare for sending a release order to the corresponding pulsing relay, and to set the correspoinding bit in the table DDPTBL and the flag DISC in STATWD. When these monitoring operations are completed, subroutine CHECK interrogates the DISC and TBL flags in STATWD, and if either is set, it arranges for release orders to be sent to those relays in circuit 138 which have failed or which are associated with a subscriber disconnect. It does this by reinitializing the delay timing and pulsing timing bytes in word 0 of PASTBL to count states of 6 and 60 respectively, and by then executing the program at program address SEND, where the appropriate distribute orders are sent. At program address POUT, the pass counter in STATWD is then incremented to the next pass and the PULSE subroutine exits to the CHANGES subroutine as already described. The above operations pertaining to premature disconnect and to pulsing relay failures are discussed in more detail hereinafter.

Assuming that no relay failures have occurred and that no subscriber has prematurely disconnected, the PULSE subroutine merely increments the pass counter and exits to subroutine CHANGES. Subroutine CHANGES interrogates the TBL and DISC flags in STATWD to determine if any unadministered abnormality has been detected by the PULSE subroutine. Assuming there were none, CHANGES merely exits to BLSTART, as before described.

Function 1 for pass 0 is still in effect since the pulsing timing interval of 300 milliseconds has not yet expired. On a subsequent entry to the PULSE subroutine for pass 0 the 300-millisecond interval will have expired and, at this time, subroutine PULSE initializes all bits in words 0 and 4 of the order table PROTBL to a 0 state so that distribute orders will be executed to release the corresponding relays in circuit 138. Subroutine PULSE also reinitializes the pulse and delay timing bytes to respective count states of 6 and 60, and it increments the function byte in pass word 0 of PASTBL to function 2 to await the expiration of the delay and pulse timing intervals. Pulsing relay release orders are then executed at program address SEND. At a subsequent time, when pass 0 is again executed, the PULSE subroutine interrogates the delay timing and pulse timing bytes in function 2 to determine the appropriate actions to take. As long as the delay timing has not expired, subroutine PULSE merely increments the pass count and exits. When the delay timing has expired and the pulse timing has not, the PULSE subroutine executes the program in function 0 at program address CHECK to test for calling party disconnect and release order failures. On a subsequent execution of pass 0, when the pulsing timing has expired, the PULSE subroutine executes the program at program address SCAN, which interrogates the appropriate bytes in the pulsing data register PDREG to determine if any pulse counts remain for distribute points for which the BUSY flag is set. In the example under discussion, since we have executed only one pulsing order to address 0, a count of 3 is still stored in PDREG byte 0. Subroutine PULSE therefore decrements the count, as described above, and sets bit 0 of word 0 in the order table PROTBL so that an operate distribute order will again be sent to address 0.

Assuming that no failures or premature calling party disconnects occur, the foregoing process continues with respect to all message register pulsing addresses then associated with calls in progress until the respective pulse counts are completed and the corresponding pulse count bytes in PDREG are 0. At this time, the BUSY bits in the respective PDREG bytes are cleared by subroutine PULSE at program address SCAN and pulsing is terminated to the respective pulsing address.

During the time that the call under discussion is in progress, AMARC 103 continues to perform timing operations so that charging may be administered against each initial and overtime period. In this example, the initial timing period is 3 minutes. At the end of this period, AMARC 103 determines the overtime charging for the call and the number of pulses for the overtime interval, here 7 pulses for 5 minutes, and transmits a new message to RMRP 134 to pulse address 0 accordingly. This message is received by RMRP 134 and processed in the same manner as above described for the initial period pulsing. Of course, AMARC 103 also updates the billing information stored in the appropriate call register record CRR0-00 in FIG. 18 for this call to account for the additional overtime charging.

Calling Party Disconnect During Pulsing

It is, of course, possible that a calling subscriber may disconnect at any time during a call, including the interval of time during which pulsing is in progress to the subscriber's message register. In the case of a hotel/motel PBX, it is also possible that the message register then being pulsed may become associated with another call before the pulsing is completed if continued. In such an event, it is necessary, in order to avoid improperly charging a guest, to discontinue pulsing to the message register in question. To detect premature disconnects, the subroutine PULSE, during pulse timing operations in function 1 and function 2 at program address CHECK, scans the S-lead of each PBX trunk line associated with the pulsing addresses served on the pass then being executed and compares their states to that of the corresponding words in table PROTBL. If the S-lead shows an on-hook condition and the corresponding bit in PROTBL indicates that the message register pulsing relay in circuit 138 is then operated, it is concluded that the subscriber has disconnected during pulsing message to his register. In this event, the program proceeds to release the pulsing relay in question and to discontinue further pulsing to that relay. First, it clears the corresponding bit in PROTBL to prepare for sending a release order to the relay. Secondly, it sets the corresponding bit in the disconnect table DDPTBL, which identifies the relay, and it sets flag DISC in the status word STATWD. Finally, it reinitializes the delay and pulse timing bytes in the pass table PASTBL to prepare for timing the release order and then transfers to program address SEND where orders are executed to all the pulsing relays associated with the pass in question in accordance with the state of the bits in the corresponding words of table PROTBL.

After the orders have been executed, subroutine PULSE exits to the CHANGES subroutine in a normal fashion. Subroutine CHANGES detects that the flag DISC is set and, in response, it generates a message for transmission to AMARC 103 to alert it of the disconnect and of the number of pulses that were not executed to the pulsing relay in question. In order to identify the pulsing relay, CHANGES scans the table DDPTBL and locates the first bit set therein. The word number and bit number of that bit identify the pulsing relay. The bit is cleared and the identification data is used to address the pulsing data register PDREG to retrieve the unexecuted pulse count. The pulse count and BUSY flag in the PDREG byte are then cleared and the generated message is loaded into the output buffer (not shown) for transmission to AMARC 103. Because of program timing considerations, only the first bit set in DDPTBL is processed during this entry to CHANGES. In order to ensure that other disconnect entries in table DDPTBL, if any, are processed, the DISC flag is left set. Thus on the next entry to subroutine CHANGES, the DDPTBL table is again scanned for the first bit set therein. This process continues with each entry to CHANGES until finally, DDPTBL is found to contain no set bits. At this time, CHANGES resets the DISC flag in STATWD.

Operations similar to those described above for premature disconnect are performed whenever it is found that a pulsing order to a relay in circuit 138 has failed. During the execution of the program at program address CHECK, the M-lead scan points associated with the PROTBL table words for the pass in question are scanned, and if it is found that any relay to which an operate order has been sent is in the released state, the corresponding bits are cleared in table PROTBL and set in the trouble table PTTBL. The TBL flag in STATWD is also set, and the delay and pulsing timing in the appropriate word of PASTBL are reinitialized to provide timing for pulsing relay release orders which are to be sent. Subroutine PULSE, at program address SEND, then distributes orders in accordance with the bits of the appropriate words in PROTBL. When the CHANGES subroutine is entered, it detects the TBL flag set. It then scans the trouble table PTTBL to find the first bit set identifying a failing relay, and it retrieves from the appropriate byte of the pulsing data register PDREG the unexecuted pulse count which is then used to generate a message to AMARC 103. The byte in PDREG is then cleared as it was for premature disconnect. Only one entry in PTTBL is processed per entry to CHANGES as described above for premature disconnect entries, and the TBL flag is left set by CHANGES until a scan of PPTBL at a subsequent time reveals no bits set therein. At this time, the TBL flag STATWD is cleared.

Call Data Accumulator Disconnect Operations

It is recalled that call data accumulator (CDA) 121 was in state 6 for scan port address (SPA) 0 when the discussion of CDA 121 was discontinued after it detected an answer condition for the call from a station at hotel/motel 102-1 to station 234-5678. CDA 121 remains in the answer state 6 in FIG. 3 for SPA 0 so long as both the calling and called subscribers remain offhook. If the calling subscriber hangs up first, multiplexer 122 detects an open loop, no sleeve condition (threshold B) at line finder 0 in line finder group 110 on the next scan cycle of SPA 0. At that time, scan control circuit (SCC) 124 progresses to state 2 (transfer path 317) as shown in FIG. 3 where it remains for only one cycle. The purpose of state 2 is to ensure that the detected B threshold is not due to a momentary noise condition. Should the answer threshold G return before the next scan of SPA 0, then CDA 121, at that time, returns to the answer state 6 (transfer path 320) as if the noise condition had never occurred. Assuming however that the B threshold persists, then on the next scan of SPA 0, CDA 121 transfers to the "disconnect calling party" state 14 (transfer path 321) and on the succeeding scan cycle to the "disconnect" state 3 (transfer path 322).

In the event the called party disconnects first while CDA 121 is in "answer" state 6, a closed normal loop with sleeve condition (threshold E) is detected, which also causes a transfer to state 2. On the succeeding scan cycle, if the threshold E persists, CDA 121 then transfers to the "disconnect called party" state 12 (transfer path 323), where it remains until the threshold B is detected on SPA 0 indicating that the calling subscriber has also disconnected. CDA 121 then transfers from state 12 to the "disconnect calling party" state 14 (transfer path 324), and on the succeeding scan cycle to the "disconnect" state 3 (transfer path 322).

In state 3 an attempt is made to load a disconnect message for SPA 0 into the output buffer 1100, but only if the B control flag is set indicating that an answer message was sent at the beginning of this call. These conditions cause the activation of gate 614 which generates a signal on lead LDDISC to request the loading of the disconnect message. LDDISC, in conjunction with a timing pulse on lead WDSTB from timing circuit 1010, activates gate 724 to generate a signal on lead LDDISCA to logic circuit 1302 which controls the generation of the disconnect message. Control logic 1302 generates a signal on its output lead $\overline{SHLDACK}$ to acknowledge that it received the disconnect message request. The complement of that signal is applied to gate 612. The $\overline{DFIN}$ input to that gate is also present at this time since, it is recalled, the D control flag is only activated to request the loading of a "delayed disconnect" message. As a result, a signal is generated on lead CFSET1 to set the C control flag, thereby indicating that a disconnect message is in the process of being loaded. On the next scan cycle, which occurs in state 3 because the state looping feature is in effect, a signal appears on CFIN from shift register memory 801 and disables gate 614 to prevent the generation on subsequent scan cycles of the signal on lead LDDISC.

The control logic 1302, when it generates the signal on lead $\overline{SHLDACK}$, also generates a signal on lead SHTWD, which informs the output buffer 1100 that a short message consisting of two words is to be loaded. As a result of this signal, the input control logic 1102 of the output buffer generates signals on its output leads SHT and $\overline{LOAD}$ which are applied to the output message gating logic 815 to initiate the generation of sequential loading signals on leads $\overline{COS}$ and $\overline{CIS}$. These signals are generated in accordance with word count signals on leads W(0-2) received by logic 815 from the output buffer 1100. The first signal appearing on lead $\overline{COS}$ is applied to the disconnect message status generator 1301 and to the SPA register 1303 in status control circuit 1300. In response, generator 1301 applies predetermined signals to bus leads D(0-7) which identify this message as a disconnect message. In addition, the most significant bit of the scan port address, here SPA 0, is applied to the bus lead D8 from register 1303. Thereafter the $\overline{CIS}$ signal is applied to register 1303 and causes the remaining bits of the SPA address to be gated from the register 1303 to bus leads D(0-7). Both of these words applied to the bus are received sequentially by buffer storage 1101, which is enabled by the input control logic 1102. When both words have been loaded, input control logic 1102, which has been primed to expect only two words by the signal on lead SHTWD, generates a signal on its output lead $\overline{LDSHCMP}$ to reset the disconnect message status generator 1303 and the SPA register 1301 in the status control circuit. Input control logic 1102 then removes all signals from its output leads and is once again available for other loading operations.

If the output buffer storage 1101 is temporarily full at the time the request to load the foregoing message is initiated, the request is unsuccessful. In this event, the disconnect message control logic 1302, recognizing that the buffer storage is full, is unresponsive to the request signal on lead LDDISCA, and does not generate signals on leads $\overline{SHLDACK}$ and SHTWD. As a result, the output buffer 1100 is unaware of the request, and gate 612 is not activated to set the C control flag. For this reason, the state looping is incorporated into state 3 to cause CDA 121 to remain in state 3 for 3 scan cycles whether or not the load request is successful. Thus, 3 attempts to load the message are provided on each of the three scans of SPA 0. Should all 3 attempts fail, then on the fourth scan of SPA 0 after entering state 3, CDA 121 transfers to a "delay disconnect" state 23 (transfer path 225) regardless of the threshold then present. If the disconnect message load request is not successful in state 3, the D control flag is set in state 23 to cause the generation of a request to load a "delayed disconnect" message instead of the disconnect message. This is controlled by gate 613, which is partially enabled when CDA 121 is in state 23. The input BFIN to gate 613 is high if an answer message was previously loaded; the input $\overline{CFIN}$ is high if the disconnect message request was unsuccessful in state 3, and the input $\overline{SHLDACK}$ is also high since the disconnect request was never acknowledged. Accordingly, gate 613 generates a signal on lead DFSET1 to set the D control flag. On subsequent cycles, the D control flag is maintained set by the resulting signal on lead DFIN to gating logic 723, which responds by applying a high signal on lead DFOUT to shift register 801. The DFIN signal is also applied to gate 616 on subsequent cycles to continue to generate a message load request signal on lead LDDISC. This continues until the "delay disconnect" message is loaded or until an answer threshold is received on SPA 0 which relates to a different call. Assuming that the "delayed disconnect" message request is eventually acknowledged, the same loading steps as described above for the disconnect message are performed, with the exception that the D control flag signal on lead DFIN to the disconnect message status generator 1301 causes it to apply a different predetermined status code to the bus leads D(0–7) for loading into the output buffer to distinguish this message as a "delayed disconnect".

On the subsequent scan cycle after entering the "delayed disconnect" state 23, CDA 121 transfers to the idle state 0 for SPA 0 (transfer path 226). The state decoder 704 recognizes state 0 and generates a signal on lead $\overline{CLR}$ which controls flag gating logic 721 to reset the A and B control flags in shift register 801. State 0 also activates gate 617 which applies a signal to lead $\overline{CFCLR1}$. This signal controls gating logic 722 to reset the C control flag in shift register 801. The signal on lead $\overline{CLR}$ also activates gate 1021 in the auxiliary circuit to apply a signal to lead ALZ23. This signal, in turn, resets all other memory in shift register 801 associated with SPA 0 except the D control flag which, if set, remains set in order to continue to request the loading of the "delayed disconnect" message. As mentioned above, the D flag will remain set until the request to load the "delayed disconnect" message into output buffer 1100 is acknowledged by a signal on lead $\overline{SHLDACK}$. This signal causes gating logic 723 to then reset the D flag by applying a low signal to output lead DFOUT extending to shift register 801.

The foregoing disconnect or "delayed disconnect" message is shortly received by AMARC 103, which responds by making a message accounting tape entry from its call data it maintained in call register record CRR0-00, to allow the subsequent billing of hotel/motel 102-1. AMARC 103 then terminates all timing and charging operations associated with the call.

It is to be understood that the above-described arrangement is merely illustrative of the application of the principles of the invention and that other arrangements may be devised by those skilled in the art without departing from the spirit and scope of the invention.

What is claimed is:

1. An arrangement for providing message register pulses for message registers at a remote site, comprising
   an orginating telephone exchange,
   a message accounting center,
   pulsing means associated with the message registers,
   means at the exchange for identifying trunks routing incoming calls from the remote site to the exchange,
   means for receiving trunk identification information from the identifying means and dialed digits from an incoming trunk and for forwarding the identification information and the dialed digits to the accounting center, and
   means at the accounting center for translating the identification information and the dialed digits into message register pulsing information and for forwarding the pulsing information to the pulsing means, wherein the pulsing means has means for transmitting pulses to a message register at the remote site in accordance with the pulsing information.

2. The invention of claim 1 wherein the accounting center is coupled to the receiving and forwarding means by a data channel assigned a channel number, and wherein the translating means comprises means addressable by the channel number.

3. The invention of claim 2 wherein the translating means comprises
   first storage means addressable by the channel number to derive an entity number,
   second storage means addressable by the entity number for indicating whether the exchange serves message registers at the remote site,
   third storage means addressable by the entity number to derive a call charging interval and a number of message register pulses for the charging interval based on the dialed digits and to derive a message register pulsing address in the pulsing means in accordance with the trunk identifying information from the receiving and forwarding means.

4. The invention of claim 3 wherein the third storage means comprises
   a first memory addressable by the entity number to obtain a plurality of storage addresses,
   a second memory addressable by a first one of the storage addresses and containing a plurality of message billing index numbers individually associated with different sets of digits identifying call terminating telephone exchanges, wherein the accounting center is operative to search the different sets of digits for a match between the corresponding ones of the dialed digits to obtain the associated message billing index number,
   a third memory addressable by the obtained message billing index number to obtain initial and overtime call charging intervals and the number of message register pulses for the initial and overtime charging intervals,
   and a fourth memory addressable by a second one of the storage addresses aand containing a plurality of pulsing addresses in the pulsing means individually associated with a different set of identification digits of the trunks from the remote site to the exchange, wherein the accounting center is operative to search the different sets of trunk identification digits in the fourth memory for a match with trunk identification digits from the receiving and forwarding means to obtain the associated pulsing address.

5. The invention of claim 1 wherein the pulsing information from the accounting center includes a pulsing address in the pulsing means and a number of message register pulses to be transmitted to a message register associated with the pulsing address, and wherein the pulsing means comprises.
   storage means divided into a plurality of storage locations individually associated with different pulsing addresses for storing the number of pulses at a storage location associated with the pulsing address, and
   means for executing pulse distribute orders to the pulsing address sequentially until the number of pulses has been transmitted to the remote site.

6. The invention of claim 5 wherein the trunk from the remote site includes a pulsing lead associated with a message register at the remote site, and wherein the pulse transmitting means comprises
   a pulse distribute device connected to the pulsing lead and operated in response to the distribute orders.

7. The invention of claim 6 wherein the pulsing means further comprises
   means for monitoring the operation of the distribute device, and means responsive to a failure of the distribute device for forwarding a message to the accounting center specifying the number of distribute orders remaining to be executed to the distribute device.

8. The invention of claim 6 wherein the pulsing means further comprises
means for detecting the termination of the call on the trunk from the remote site while pulsing is in progress over the pulsing lead, and
means responsive to the detection of a call termination on the trunk for transmitting a message to the accounting center specifying the number of pulses remaining to be transmitted over the trunk.

9. The invention of claim 8 wherein the distribute device comprises a pulsing relay, and the pulsing means comprises
means for timing an interval after an execution of a pulsing order to the relay to determine an appropriate time for monitoring the operation of the relay.

10. An arrangement for providing message register pulses for message registers at a branch exchange connected to a central exchange, comprising
means for monitoring operations of line finders at the central exchange to detect call sequences on a trunk from the branch exchange,
means responsive to such a call sequence for identifying the trunk on which the call sequence is received,
means in the monitoring means for storing dialed digits received as part of the call sequence and for storing trunk identification information from the identifying means,
a processor independent of the central exchange for receiving the digits and the trunk identification information stored by the monitoring means, said processor having means for translating the digits and identification information into message register pulsing information including a pulsing address in the central exchange,
a message register pulsing circuit at the central exchange for receiving the pulsing information from the processor, and
means in the pulsing circuit for applying pulse distribute orders to the specified pulsing address in accordance with the pulsing information.

11. An arrangement for providing message register pulses for message registers at a private branch exchange connected to a step-by-step central exchange, comprising
call data accumulator means coupled to connections between line finders and first selectors of the step-by-step exchange for monitoring dialing sequences and registering dialed digits from the private branch exchange,
automatic number identification equipment at the step-by-step exchange for identifying calling lines from the private branch exchange and forwarding such calling line identifications to the call data accumulator means,
a message accounting processor remote from the step-by-step exchange,
means for transmitting from said call data accumulator means to said processor said calling line identifications and said dialed digits,
a plurality of message register leads from the step-by-step exchange to the private branch exchange,
a message register pulsing circuit at the step-by-step exchange for applying metering pulses to said message register leads,
means at the remote processor for translating said calling line identifications and said digits into message register pulsing information, and
means for receiving from said processor and applying to said message register pulsing circuit identifications of individual message register leads to be pulsed and the pulsing sequence to be applied to the individual message register leads.

12. An arrangement for providing message register pulses for message registers at a private branch exchange connected to a step-by-step central exchange, comprising
call data accumulator means coupled to the connections between line finders and first selectors of the step-by-step exchange for monitoring dialing sequences and registering dialed digits from the private branch exchange,
automatic number identification equipment at the step-by-step exchange for identifying calling lines from the private branch exchange and forwarding such calling line identifications to the call data accumulator means,
means for transmitting from said call data accumulator means to a remote message accounting processor said calling line identifications and said dialed digits on receipt of answer supervision at the step-by-step central office,
a plurality of message register leads from the step-by-step exchange to the private branch exchange,
a message register pulsing circuit for applying metering pulses to individual ones of said message register leads, and
means for receiving from said message accounting processor and applying to said message register pulsing circuit identifications of a particular message register lead to be pulsed and the pulsing sequence to be applied.

13. An arrangement for providing message register pulses for message registers at a branch exchange connected by pulsing leads between the branch exchange and a central exchange, comprising
call data accumulator means at the central exchange coupled to the connections between line finders and first selectors at the central exchange for monitoring calls and registering dialed digits from the branch exchange,
automatic identification equipment at the central exchange activated by said call data accumulator means in response to receipt of a call answer signal for identifying a calling line from the branch exchange and forwarding the calling line identification to the call data accumulator means,
a first processor separate from the central exchange,
means for transmitting from the call data accumulator means to the first processor the line identification and dialed digits,
a message register pulser at the central exchange including a second processor, a pulse distributor having a plurality of distribute addresses, and a message register relay circuit having a plurality of relays individually associated with separate ones of the distribute addresses and the pulsing leads,
a first memory at the first processor containing a plurality of storage blocks each identified by digits of a called exchange, each block containing message register pulsing information in accordance with the distance between the central exchange and the called exchange, a second memory at the first processor containing a plurality of separate data each associated with a different one of the pulsing leads and each containing a different distributor address in the message register pulser for controlling the relays associated with the pulsing leads, wherein the first processor is responsive to receipt of the information from the call data accumulator means identifying said calling line and the dialed digits to generate from the first and second memories a message register pulsing command to the second processor, including an address in the distributor associated with the calling line and message register pulsing data, and to initiate timing of successive charging periods in accordance with information in the first and second memories whereby other commands are generated to the message register pulser upon the expiration of each charging period until the timing is terminated by receipt of a message from the call data accumulator means that the call has been terminated, means at the central exchange for receiving the commands and transmitting them to the second processor, whereby the second processor executes pulsing orders in accordance with the commands to the distribute addresses specified in the commands.

* * * * *